US010815913B2

(12) United States Patent
Bruner et al.

(10) Patent No.: US 10,815,913 B2
(45) Date of Patent: Oct. 27, 2020

(54) SYSTEMS, METHODS, AND APPARATUS FOR OPERATION OF DUAL FUEL ENGINES

(71) Applicant: Cummins Inc., Columbus, IN (US)

(72) Inventors: C. Larry Bruner, Greenwood, IN (US); Phanindra V. Garimella, Bloomington, IN (US); Geomy George, Indianapolis, IN (US); Timothy P. Lutz, Columbus, IN (US); J. Steven Kolhouse, Columbus, IN (US); Edmund P. Hodzen, Columbus, IN (US); Robert Charles Borregard, Charleston, SC (US); Mark A. Rosswurm, Columbus, OH (US); Axel Otto zur Loye, Columbus, OH (US)

(73) Assignee: Cummins Inc., Columbus, IN (US)

( * ) Notice: Subject to any disclaimer, the term of this patent is extended or adjusted under 35 U.S.C. 154(b) by 509 days.

(21) Appl. No.: 15/585,475

(22) Filed: May 3, 2017

(65) Prior Publication Data
US 2017/0234245 A1 Aug. 17, 2017

Related U.S. Application Data

(63) Continuation of application No. PCT/US2015/059012, filed on Nov. 4, 2015.
(Continued)

(51) Int. Cl.
F02D 19/08 (2006.01)
F02D 41/22 (2006.01)
(Continued)

(52) U.S. Cl.
CPC ....... *F02D 19/081* (2013.01); *F02D 19/0628* (2013.01); *F02D 19/0647* (2013.01);
(Continued)

(58) Field of Classification Search
CPC ............... F02D 19/081; F02D 19/0628; F02D 19/0647; F02D 19/10; F02D 19/105;
(Continued)

(56) References Cited

U.S. PATENT DOCUMENTS 4,416,244 A 11/1983 McDonald
4,463,734 A 8/1984 Akeroyd
(Continued)

FOREIGN PATENT DOCUMENTS

DE 19615547 2/1999
EP 1570163 8/2006
(Continued)

OTHER PUBLICATIONS

International Search Report and Written Opinion, PCT/US2015/0059012, Cummins Inc., Jan. 13, 2016, 18 pgs.

*Primary Examiner* — Syed O Hasan
(74) *Attorney, Agent, or Firm* — Taft Stettinius & Hollister LLP

(57) ABSTRACT

Systems, methods and apparatus for controlling operation of dual fuel engines are disclosed that regulate the fuelling amounts provided by a first fuel and a second fuel during operation of the engine. The first fuel can be a liquid fuel and the second fuel can be a gaseous fuel. The fuelling amounts are controlled to improve operational outcomes of the duel fuel engine.

11 Claims, 16 Drawing Sheets

Related U.S. Application Data

(60) Provisional application No. 62/074,989, filed on Nov. 4, 2014, provisional application No. 62/101,422, filed on Jan. 9, 2015.

(51) Int. Cl.
*F02D 19/06* (2006.01)
*F02D 35/02* (2006.01)
*F02D 19/10* (2006.01)
*F02D 41/00* (2006.01)
*F02D 41/14* (2006.01)

(52) U.S. Cl.
CPC ........... *F02D 19/10* (2013.01); *F02D 19/105* (2013.01); *F02D 35/027* (2013.01); *F02D 41/0025* (2013.01); *F02D 41/0027* (2013.01); *F02D 41/1498* (2013.01); *F02D 41/221* (2013.01); *F02D 41/005* (2013.01); *F02D 2041/228* (2013.01); *F02D 2200/0611* (2013.01); *Y02T 10/36* (2013.01); *Y02T 10/40* (2013.01)

(58) Field of Classification Search
CPC ............... F02D 35/027; F02D 41/0025; F02D 41/0027; F02D 41/1498; F02D 41/221
See application file for complete search history.

(56) References Cited

U.S. PATENT DOCUMENTS

| | | | |
|---|---|---|---|
| 4,619,240 A | 10/1986 | Bedford et al. | |
| 4,641,625 A | 2/1987 | Smith | |
| 4,817,568 A | 4/1989 | Bedford | |
| 4,955,326 A | 9/1990 | Helmich | |
| 5,052,214 A | 10/1991 | Dils | |
| 5,088,462 A | 2/1992 | Hertweck et al. | |
| 5,355,854 A | 10/1994 | Aubee | |
| 5,622,053 A | 4/1997 | Freen | |
| 5,711,270 A | 1/1998 | Pedersen | |
| 5,791,145 A | 8/1998 | Freen | |
| 5,937,800 A | 8/1999 | Brown et al. | |
| 5,975,050 A | 11/1999 | Brown et al. | |
| 6,055,963 A | 5/2000 | Brown et al. | |
| 6,073,592 A | 6/2000 | Brown et al. | |
| 6,101,966 A | 8/2000 | Brown et al. | |
| 6,745,749 B2 | 6/2004 | Unland et al. | |
| 6,925,987 B2 | 8/2005 | Mashiki | |
| 6,926,961 B2 | 8/2005 | Mashiki | |
| 6,935,311 B2 | 8/2005 | Visser | |
| 7,007,661 B2 | 3/2006 | Warlick | |
| 7,055,506 B2 | 6/2006 | Kaiser et al. | |
| 7,117,862 B2 | 10/2006 | May | |
| 7,210,455 B2 | 5/2007 | Visser et al. | |
| 7,270,089 B2 | 9/2007 | Wang | |
| 7,367,223 B2 | 5/2008 | Kettl et al. | |
| 7,367,233 B2 | 5/2008 | Kettl et al. | |
| 7,383,816 B2 | 6/2008 | Zurlo | |
| 7,387,091 B2 | 6/2008 | Ritter | |
| 7,509,209 B2 | 3/2009 | Davis et al. | |
| 7,533,634 B2 | 5/2009 | Ritter et al. | |
| 7,574,993 B2 | 8/2009 | Gillespie et al. | |
| 7,778,761 B2 | 8/2010 | Bockhoff et al. | |
| 7,805,237 B2 | 9/2010 | Boehme et al. | |
| 7,895,821 B2 | 3/2011 | Annigen et al. | |
| 7,913,673 B2 | 3/2011 | Vanderslice et al. | |
| 7,958,866 B2 | 6/2011 | Thomas | |
| 7,996,146 B2 | 8/2011 | Ruiz | |
| 8,000,880 B2 | 8/2011 | Shibata et al. | |
| 8,073,638 B2 | 12/2011 | Birk et al. | |
| 8,126,634 B2 | 2/2012 | Vestrini et al. | |
| 8,347,861 B2 | 1/2013 | Shimizu et al. | |
| 2002/0166515 A1 | 11/2002 | Ancimer | |
| 2007/0119415 A1* | 5/2007 | Lewis | F02D 19/088 123/295 |
| 2007/0175268 A1 | 8/2007 | Honda | |
| 2009/0082940 A1 | 3/2009 | Ishizuka et al. | |
| 2010/0228463 A1 | 9/2010 | Kweon et al. | |
| 2011/0114058 A1 | 5/2011 | Cohn et al. | |
| 2011/0218728 A1 | 9/2011 | Vestrini et al. | |
| 2012/0055457 A1 | 3/2012 | Wong et al. | |
| 2012/0078487 A1 | 3/2012 | Light-Holets | |
| 2012/0210988 A1 | 8/2012 | Willi | |
| 2012/0227389 A1 | 9/2012 | Hinderks | |
| 2012/0272935 A1 | 11/2012 | Magnusson | |
| 2014/0331970 A1* | 11/2014 | Bidner | F02D 19/0642 123/435 |
| 2014/0366840 A1* | 12/2014 | Sivasubramanian | F02D 41/0025 123/399 |
| 2014/0373822 A1* | 12/2014 | Rosswurm | F02D 41/0027 123/676 |
| 2016/0010581 A1* | 1/2016 | Sixel | F02D 41/0077 60/601 |

FOREIGN PATENT DOCUMENTS

| | | |
|---|---|---|
| GB | 1503086 | 3/1978 |
| GB | 2385433 | 8/2003 |
| JP | 60053644 | 3/1985 |
| WO | 2011002353 | 1/2011 |
| WO | 2012115941 | 8/2012 |

* cited by examiner

SYSTEMS, METHODS, AND APPARATUS FOR OPERATION OF DUAL FUEL ENGINES

CROSS-REFERENCE TO RELATED APPLICATIONS

The present application is a continuation of International Patent App. No. PCT/US2015/59012 filed on Nov. 4, 2015, claims priority to and the benefit of the filing date of U.S. Provisional Application Ser. No. 62/074,989 filed on Nov. 4, 2014 and U.S. Provisional Application Ser. No. 62/101,422 filed on Jan. 9, 2015, each of which is incorporated herein by reference in its entirety.

FIELD OF THE INVENTION

The present invention relates generally to dual fuel internal combustion engines, and more particularly is concerned with systems and methods for fuelling control of a dual fuel internal combustion engine.

BACKGROUND

An example dual fuel engine is an engine that includes a first fuel source that is utilized as the sole fuel source during certain operating conditions and a second fuel source that is integrated with the first fuel source at other operating conditions. In certain applications, the first fuel source is a diesel fuel and the second fuel source is natural gas. The diesel fuel provides, in some cases, the initial, low load levels of operation and is used for ignition for the natural gas at higher load operations. The substitution of natural gas for diesel fuel reduces the costs of operating the engine, particularly when the engine is employed at locations where natural gas is abundant or available at low cost.

When the engine is operating in dual fuel mode, natural gas fuel is introduced into the intake system. The air and natural gas mixture from the intake is drawn into the cylinder, just as it would be in a spark-ignited engine, but the air-to-fuel ratio of the charge mixture can be much leaner than a typical spark-ignited engine. Diesel fuel is injected near the end of the compression stroke, just as it would be in a traditional compression-ignition engine. The diesel fuel is ignited by energy compression heating of the charge and the energy released from combustion of the diesel fuel causes the natural gas to burn. A dual fuel engine can operate either entirely on diesel fuel or on the substitution mixture of diesel and natural gas, but generally cannot operate on natural gas alone except where an auxiliary ignition source is provided to the cylinder.

While some control strategies compensate for natural gas quality variations by controlling gas substitution to obtain a desired air-to-fuel ratio, such approaches are limited by the ability to accurately measure and/or predict air flow rates, fuel properties, and sometimes gaseous fuel flow rates. Therefore, further contributions in operation and control of dual fuel engines are needed.

SUMMARY

Unique systems, methods and apparatus for controlling operation of dual fuel engines are disclosed that regulate the fuelling amounts provided by a first fuel and a second fuel during operation of the engine. In one embodiment, the first fuel is a liquid fuel and the second fuel is a gaseous fuel. The fuelling amounts are controlled to improve operational outcomes of the engine. In another embodiment, systems, methods and apparatus are disclosed for dual fuel substitution rate optimization in the presence of engine knock.

Another exemplary embodiment is a system comprising a dual-fuel engine structured to selectably combust a combination of liquid fuel injected into a cylinder of the engine and gaseous fuel provided to the cylinder; and a controller structured to control a substitution parameter for substitution of the gaseous fuel for the liquid fuel based upon information of an engine load, an intake manifold temperature, and a gaseous fuel quality. The controller is further structured to determine the gaseous fuel quality based upon at least one of a first parameter input by an operator and a second parameter determined by the controller.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
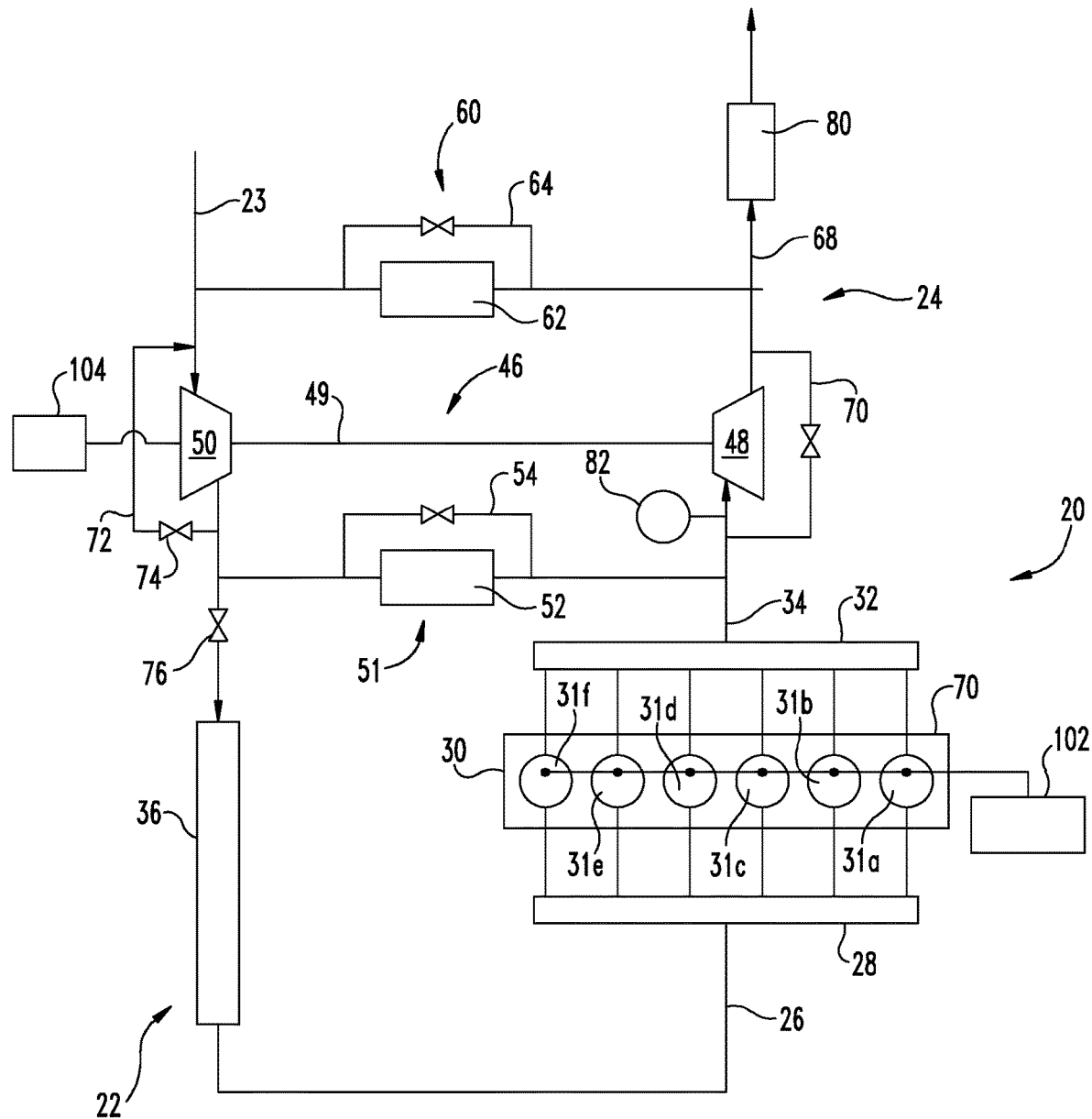
FIG. 1 is a schematic illustration of a portion of an internal combustion engine system with a dual fuel system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
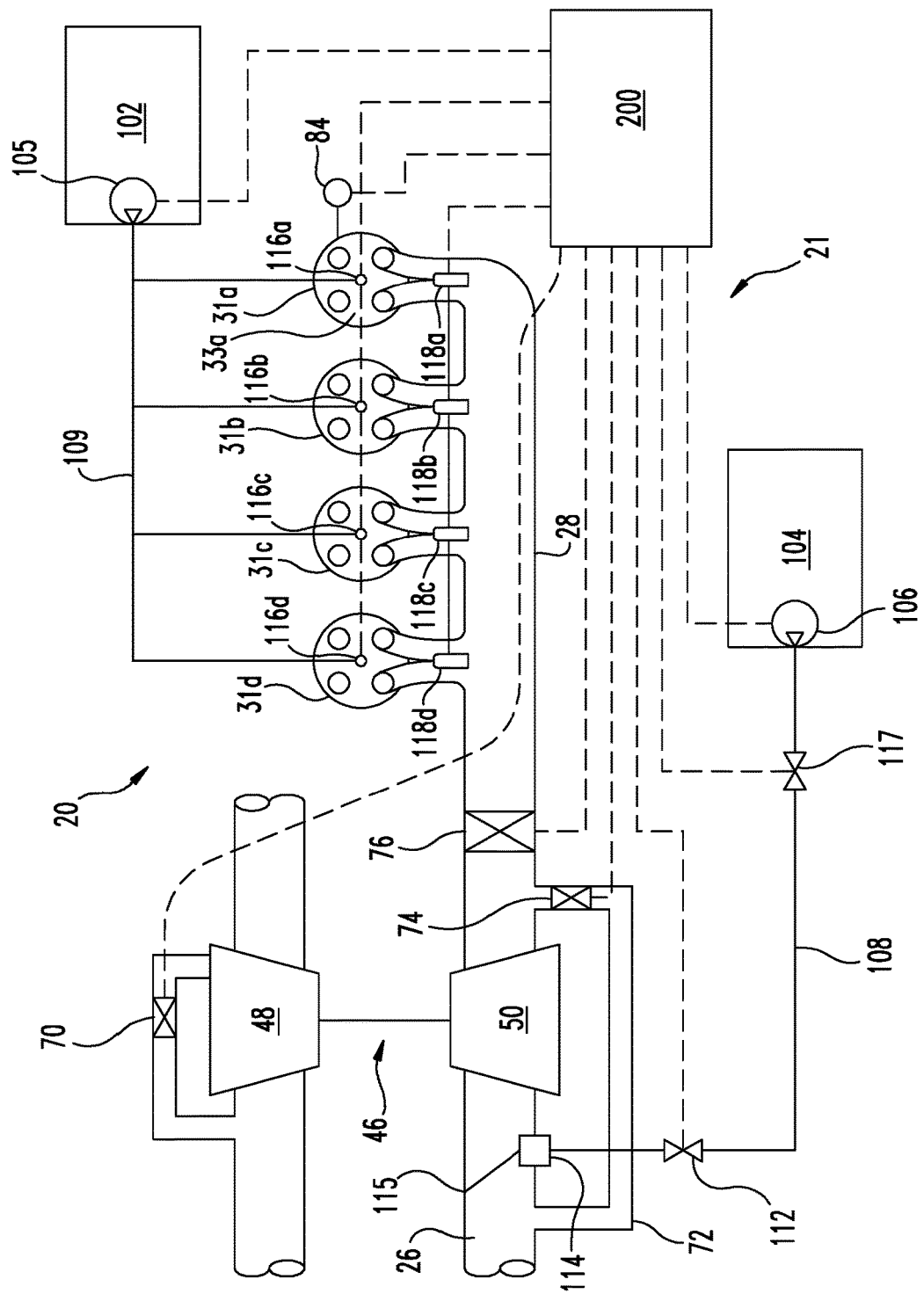
FIG. 2 is another schematic illustration of a part of the internal combustion engine system of FIG. 1 showing various embodiments of a dual fueling system.

With reference to FIGS. 1 and 2, an internal combustion engine system 20 is illustrated in schematic form. A fueling system 21 (FIG. 2) is also shown in schematic form that is operable with internal combustion engine system 20 to provide fueling for a dual fuel engine 30 from a first fuel source 102 and a second fuel source 104. Internal combustion engine system 20 includes dual fuel engine 30 connected with an intake system 22 for providing a charge flow to engine 30 and an exhaust system 24 for output of exhaust gases. In certain embodiments, the duel fuel engine 30 includes a lean combustion engine such as a diesel cycle engine that uses a primary or first fuel that is a liquid fuel such as diesel fuel and a secondary or second fuel that is a gaseous fuel such as natural gas. The second fuel can be, for example, natural gas, bio-gas, commercially available gas, methane, ethane, propane (LPG), butane, ethanol, producer gas, field gas, nominally treated field gas, well gas, nominally treated well gas, liquefied natural gas (LNG), compressed natural gas, landfill gas, condensate, coal-bed methane (CBM), liquid fuels that are readily vaporized (such as gasoline), and mixtures of these. However, other types of first and second fuels are not precluded, such as any suitable liquid fuel and gaseous fuel. In certain embodiments, the first fuel is a fuel suitable for lean burning, and the second fuel is a fuel that utilizes stoichiometric or near-stoichiometric combustion except when combined with the first fuel during a dual fueling operation. In the illustrated embodiment, the dual fuel engine 30 includes six cylinders 31a-31f in an in-line arrangement. However, the number of cylinders (collectively referred to as cylinders 31) may be any number, and the arrangement of cylinders 31 may be any arrangement, and is not limited to the number and arrangement shown in FIG. 1.

Dual fuel engine 30 includes an engine block 70 that at least partially defines the cylinders 31a, 31b, 31c, 31d, 31e, 31f (collectively referred to as cylinders 31.) A plurality of pistons (not shown) may be slidably disposed within respective ones of the cylinders 31 to reciprocate between a top-dead-center position and a bottom-dead-center position. Each of the cylinders 31, its respective piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, dual fuel engine 30 is a four stroke engine. That is, for each complete engine cycle (i.e., for every two full crankshaft rotations), each piston of each cylinder 31 moves through an intake stroke, a compression stroke, a combustion or power stroke, and an exhaust stroke. Thus, during each complete cycle for the depicted six cylinder engine, there are six strokes during which air is drawn into individual combustion chambers from intake supply conduit 26 and six strokes during which exhaust gas is supplied to exhaust manifold 32.

The dual fuel engine 30 includes cylinders 31 connected to the intake system 22 to receive a charge flow and connected to exhaust system 24 to release exhaust gases produced by combustion of the first and/or second fuels. Exhaust system 24 may provide exhaust gases to a turbocharger 46, although a turbocharger is not required. In still other embodiments, multiple turbochargers are included to provide high pressure and low pressure turbocharging stages that compress the intake flow.

Furthermore, exhaust system 24 can be connected to intake system 22 with one or both of a high pressure exhaust gas recirculation (EGR) system 51 and a low pressure EGR system 60. EGR systems 51, 60 may include a cooler 52, 62 and bypass 54, 64, respectively. In other embodiments, one or both of EGR systems 51, 60 are not provided. When provided, EGR system(s) 51, 60 provide exhaust gas recirculation to engine 30 in certain operating conditions. In any EGR arrangement during at least certain operating conditions, at least a portion the exhaust output of cylinder(s) 31 is recirculated to the engine intake system 22. In the high pressure EGR system 51, the exhaust gas from the cylinder (s) 31 takes off from exhaust system 24 upstream of turbine 48 of turbocharger 46 and combines with intake flow at a position downstream of compressor 50 of turbocharger 46 and upstream of an intake manifold 28 of engine 30. In the low pressure EGR system 60, the exhaust gas from the cylinder(s) 31a-31f takes off from exhaust system 24 downstream of turbine 48 of turbocharger 46 and combines with intake flow at a position upstream of compressor 50 of turbocharger 46. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more inlet supply conduits 26 connected to an engine intake manifold 28, which distributes the charge flow to cylinders 31 of engine 30. Exhaust system 24 is also coupled to engine 30 with an engine exhaust manifold 32. Exhaust system 24 includes an exhaust conduit 34 extending from exhaust manifold 32 to an exhaust valve. In the illustrated embodiment, exhaust conduit 34 extends to turbine 48 of turbocharger 46. Turbine 48 includes a valve such as controllable wastegate 70 or other suitable bypass that is operable to selectively bypass at least a portion of the exhaust flow from turbine 48 to reduce boost pressure and engine torque under certain operating conditions. In another embodiment, turbine 48 is a variable geometry turbine with a size-controllable inlet opening. In other embodiments, the exhaust valve is an exhaust throttle and/or wastegate. While specific examples have been discussed, no particular form of intake or exhaust control valving is required, nor is the use of the same precluded.

An aftertreatment system 80 can be connected with an outlet conduit 68. The aftertreatment system 80 may include, for example, oxidation devices (DOC), particulate removing devices (DPF, CDPF), constituent absorbers or reducers (SCR, AMOX, LNT), reductant systems, and other components if desired.

In one embodiment, exhaust conduit 34 is flow coupled to exhaust manifold 32, and may also include one or more intermediate flow passages, conduits or other structures. Exhaust conduit 34 extends to turbine 48 of turbocharger 46. Turbocharger 46 may be any suitable turbocharger known in the art, including fixed-geometry turbocharger, variable-geometry turbine turbochargers and waste-gated turbochargers. Turbocharger 46 may also include multiple turbochargers. Turbine 48 is connected via a shaft 49 to compressor 50 that is flow coupled to inlet supply conduit 26.

Compressor 50 receives fresh air flow from intake air supply conduit 23. Second fuel source 104 may also be flow coupled at or upstream of the inlet to compressor 50 or downstream of compressor 50, as discussed further below. Intake system 22 may further include a compressor bypass 72 that connects a downstream or outlet side of compressor 50 to an upstream or inlet side of compressor 50. Compressor bypass 72 includes a control valve 74 that is selectively opened to allow charge flow to be returned to the inlet side of compressor 50 to reduce compressor surge under certain operating conditions, such as when an intake throttle 76 is closed. Inlet supply conduit 26 may include a charge air cooler 36 downstream from compressor 50 and intake throttle 76. In another embodiment, a charge air cooler 36 is located in the intake system 22 upstream of intake throttle 76. Charge air cooler 36 may be disposed within inlet air supply conduit 26 between engine 30 and compressor 50, and embody, for example, an air-to-air heat exchanger, an air-to-liquid heat exchanger, or a combination of both to facilitate the transfer of thermal energy to or from the flow directed to engine 30.

In operation of internal combustion engine system 20, fresh air is supplied through inlet air supply conduit 23. The fresh air flow or combined flows can be filtered, unfiltered, and/or conditioned in any known manner, either before or after mixing with the EGR flow from EGR systems 51, 60 when provided. The intake system 22 may include components configured to facilitate or control introduction of the charge flow to engine 30, and may include intake throttle 76, one or more compressors 50, and charge air cooler 36. The intake throttle 76 may be connected upstream or downstream of compressor 50 via a fluid passage and configured to regulate a flow of atmospheric air and/or combined air/EGR flow to engine 30. Compressor 50 may be a fixed or variable geometry compressor configured to receive air or air and fuel mixture from fuel source 104 and compress the air or combined flow to a predetermined pressure level before engine 30. The charge flow is pressurized with compressor 50 and sent through charge air cooler 36 and supplied to engine 30 through intake supply conduit 26 to engine intake manifold 28.

With further reference to FIG. 2, fuel system 21 is configured to provide dual fuelling of engine 30. Only four cylinders 31a, 31b, 31c, 31d are shown in FIG. 2, it being understood that if additional cylinders, such as cylinders 31e and 31f, or fewer cylinders, are provided they are arranged in a manner similar to the illustrated cylinders 31. Fuel system 21 includes first fuel source 102 and second fuel source 104. First fuel source 102 is configured to provide a flow of a first fuel to cylinders 31 with one or more injectors at or near each cylinder. Second fuel source 104 is connected to intake system 22 with a mixer or connection at or adjacent an inlet of compressor 50. In certain embodiments, the cylinders 31 each include at least one direct injector for delivering fuel to the combustion chamber thereof from a primary fuel source, such as first fuel source 102. In addition, at least one of a port injector at each cylinder or a mixer at an inlet of compressor 50 can be provided for delivery or induction of fuel from the second fuel source 104 with the charge flow delivered to cylinders 31.

The fueling from the first fuel source 102 is controlled to provide the sole fueling at certain operating conditions of engine 30, and fueling from the second fuel source 104 is provided to substitute for fueling from the first fuel source 102 at other operating conditions to provide a dual flow of fuel to engine 30. In embodiments where the first fuel source 102 is diesel fuel and the second fuel source 104 is natural gas, a control system including controller 200 is configured to control the flow of liquid diesel fuel from first source 102 and the flow of gaseous fuel from second source 104 in accordance with the control parameters disclosed herein.

A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 31 may include one or more direct injectors 116a-116d, respectively. The direct injectors 116a-116d may be the primary fueling device for first fuel source 102 for the cylinders 31.

A port injector, as utilized herein, includes any fuel injection device that injects the second fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 31a, 31b, 31c, 31d may include one or more port injectors 118a, 118b, 118c, 118d, respectively. In one embodiment, the port injectors 118a-118d may be the primary fueling device for second fuel source 104 to the cylinders 31. In another embodiment, the second fuel source 104 can be connected to intake system 22 with a mixer 115 at a gaseous fuel connection 114 upstream of intake manifold 28, such as at the inlet of or upstream of compressor 50. A flow control valve 117 can be provided to control the flow of gaseous fuel to engine 30 from second fuel source 104.

In certain embodiments, each cylinder 31 includes at least one direct injector that is capable of providing all of the designed fueling amount from first fuel source 102 for the cylinders 31 at any operating condition. Second fuel source 104 provides a flow of a second fuel to each cylinder 31 through a port injector or a natural gas connection upstream of intake manifold 28 to provide a second fuel flow to the cylinders 31 to achieve desired operational outcomes, such as improved efficiency, improved fuel economy, improved high load operation, and other outcomes.

One embodiment of system 20 includes fuel system 21 with at least one fuel source 102 to provide a first fuel flow to all the cylinders 31 and a second fuel source 104 that provides a second fuel flow to all the cylinders 31 in addition to the first fuel flow under certain operating conditions. First fuel source 102 includes a first fuel pump 105 that is connected to controller 200, and the second fuel source 104 includes, in one embodiment, a second fuel pump 106 that is connected to controller 200. Each of the cylinders 31 includes an injector, such as direct injectors 116a-116d associated with each of the illustrated cylinders 31a-31d of FIG. 2. Direct injectors 116a-116d are electrically connected with controller 200 to receive fueling commands that provide a fuel flow to the respective cylinder 31 in accordance with a fuel command determined according to engine operating conditions and operator demand by reference to fueling maps, control algorithms, or other fueling rate/amount determination source stored in controller 200. First fuel pump 105 is connected to each of the direct injectors 116a-116d with a first fuel line 109. First fuel pump 105 is operable to provide a first fuel flow from first fuel source 102 to each of the cylinders 31a-31d in a rate, amount and timing determined by controller 200 that achieves a desired power and exhaust output from cylinders 31.

If provided, second fuel pump 106 is connected to the inlet of compressor 50 with gaseous fuel connection 114 with a second fuel line 108 or to port injectors 118. A shutoff valve 112 can be provided in fuel line 108 and/or at one or more other locations in fuel system 21 that is connected to controller 200. Second fuel pump 106 is operable to provide a second fuel flow from second fuel source 104 in an amount determined by controller 200 that achieves a desired power and exhaust output from cylinders 31. In another embodiment, second fuel pump 106 is omitted and fuel is supplied to connection 114 or port injectors 118 under pressure from a pressurized second fuel source 104, and the flow of gaseous fuel from second fuel source 104 is controlled by flow control valve 117.

Controller 200 can be connected to actuators, switches, or other devices associated with fuel pumps 105, 106, shutoff valve 112, intake throttle 76, compressor bypass valve 74, shutoff valve 112, flow control valve 117, wastegate 70 and/or injectors 116, 118 and configured to provide control commands thereto that regulate the amount, timing and duration of the flows of the first and second fuels to cylinders 31, the charge flow, and the exhaust flow to provide the desired power and exhaust output. The positioning of each of shutoff valve 112, flow control valve 117, intake throttle 76, compressor bypass valve 74, wastegate 70, injectors 116, 118 and/or the on/off status of fuel pumps 105, 106 can be controlled via control commands from controller 200.

In other embodiments, a first subset of cylinders 31 is associated with a first cylinder bank (not shown) and a second subset of cylinders 31 is associated with a second cylinder bank. Accordingly, differing substitution rates of the gaseous fuel can be used for the cylinder banks. In certain embodiments of engines with multiple cylinder banks, the feed lines for the gaseous fuel can be separately controlled to each cylinder bank to provide the desired substitution rate of the gaseous fuel for the respective cylinder bank.

In certain embodiments of the systems disclosed herein, controller 200 is structured to perform certain operations to control engine operations and fueling of cylinders 31 with fueling system 21 to provide the desired operational outcomes. In certain embodiments, the controller 200 forms a portion of a processing subsystem including one or more computing devices having memory, processing, and communication hardware. The controller 200 may be a single device or a distributed device, and the functions of the controller 200 may be performed by hardware or instructions provided on a computer readable storage medium. The controller 200 may be included within, partially included within, or completely separated from an engine controller (not shown). The controller 200 is in communication with any sensor or actuator throughout the systems disclosed herein, including through direct communication, communication over a datalink, and/or through communication with other controllers or portions of the processing subsystem that provide sensor and/or actuator information to the controller 200.

In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the sections referencing FIGS. 3, 5, 7, 9, 11, 12 and 13-16.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of dual fuel internal combustion engines, improvements in engine torque generation and torque control, engine fuel economy performance, improvements in engine noise and vibration control for dual fuel engines, improvements in performance or operation of aftertreatment systems and/or components of dual fuel engines, and/or improvements in emissions reduction in dual fuel engines. Without limitation, example and non-limiting technological fields that are improved include the technological fields of duel fuel internal combustion engines and related apparatuses and systems as well as vehicles including the same.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The schematic flow descriptions which follow provide illustrative embodiments of methods for controlling fuelling during a dual fuelling mode of operation of internal combustion engine system 20. As used herein, a dual fuel system 21 is a fueling system in which a dual fueling mode is provided where each of the cylinders 31 of engine 30 receives a first fuel flow and a second fuel flow in addition to the first fuel flow under certain operating conditions.

However, it is contemplated that the dual fueling system 21 can be operated in a single fuel mode from first fuel source 102 upon operator selection or certain operating conditions. Operations illustrated are understood to be exemplary only, and operations may be combined or divided, and added or removed, as well as re-ordered in whole or part, unless stated explicitly to the contrary herein. Certain operations illustrated may be implemented by a computer or controller apparatus embodiment of controller 200 executing a computer program product on a non-transient computer readable storage medium, where the computer program product comprises instructions causing the computer to execute one or more of the operations, or to issue commands to other devices to execute one or more of the operations.

Figure 3:
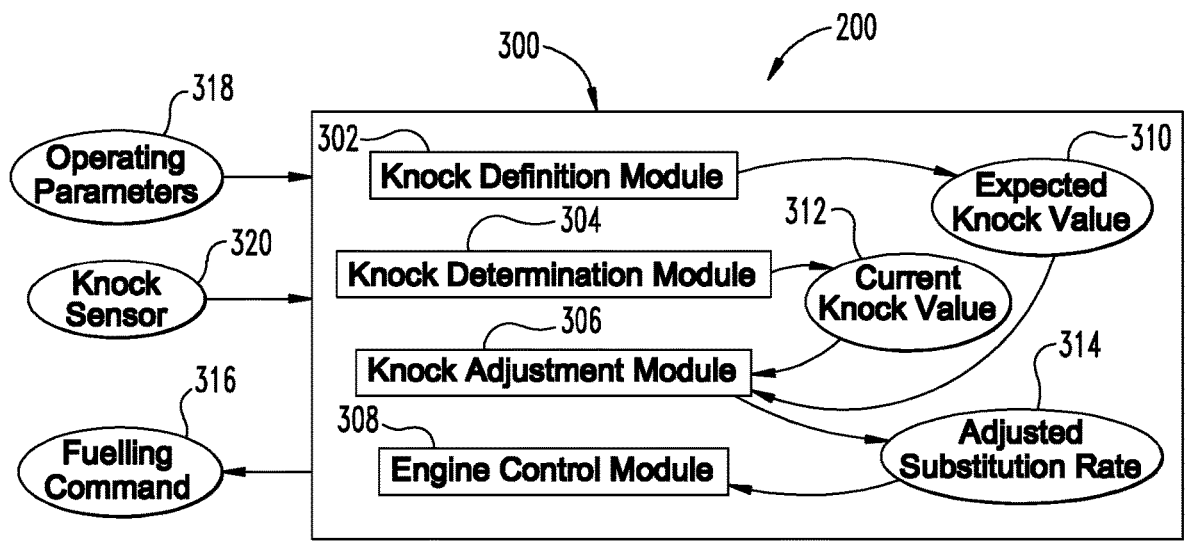
FIG. 3 is a schematic of a control apparatus for duel fuel operation of an internal combustion engine.

FIG. 3 is a schematic illustration of one embodiment of a processing subsystem 300 for controller 200 for controlling operations of dual fuel engine 30 in response to knock conditions. In certain applications, the second fuel has combustion characteristics that are highly variable. Processing subsystem 300 includes a knock definition module 302 structured to determine an expected knock value 310 for a gaseous fuel from second fuel source 104 delivered to dual fuel engine 30, a knock determination module 304 structured to determine a current knock value 312 for the gaseous fuel in the dual fuel engine 30, a knock adjustment module 306 structured to determine an adjusted substitution rate 314 for the gaseous fuel in response to comparing the expected knock value 310 and the current knock value 312, and an engine control module 308 structured to output a fuelling command 316 for fueling the dual fuel engine 30 in response to the adjusted substitution rate 314.

In one embodiment, subsystem 300 receives at least one of operating parameters 318 associated with operation of dual fuel engine 30 and a knock sensor input 320 from a knock sensor associated with dual fuel engine 30. Operating parameters 318 can include any operating parameter or parameters suitable for indicating an expected knock value and/or a current knock value. Knock sensor input 320 can include any sensor or combination of sensors suitable to provide an output of an expected knock and/or current knock value associated with operation of the dual fuel engine 30.

In a further embodiment, subsystem 300 is configured to associate the current knock value with an expected knock value that is predetermined or determined outside of a time domain in which the operating parameters 318 were used to determine the current knock value to account for variations in quality of the gaseous fuel. In a refinement of this embodiment, the one or more operating parameters 318 include an engine speed, an engine load, a charge flow rate, an air flow rate, an intake manifold temperature (IMT), an exhaust manifold temperature (EMT), an intake manifold pressure (IMP), an exhaust manifold pressure (EMP), an exhaust gas recirculation (EGR) temperature, oxygen amount, and an oxygen fraction. The knock value that occurs at the one or more operating parameters outside of the time domain in which the operating parameters are determined can be used as the expected knock value that is compared to the current knock value to determine the adjusted substitution rate for the second fuel.

Figure 4:
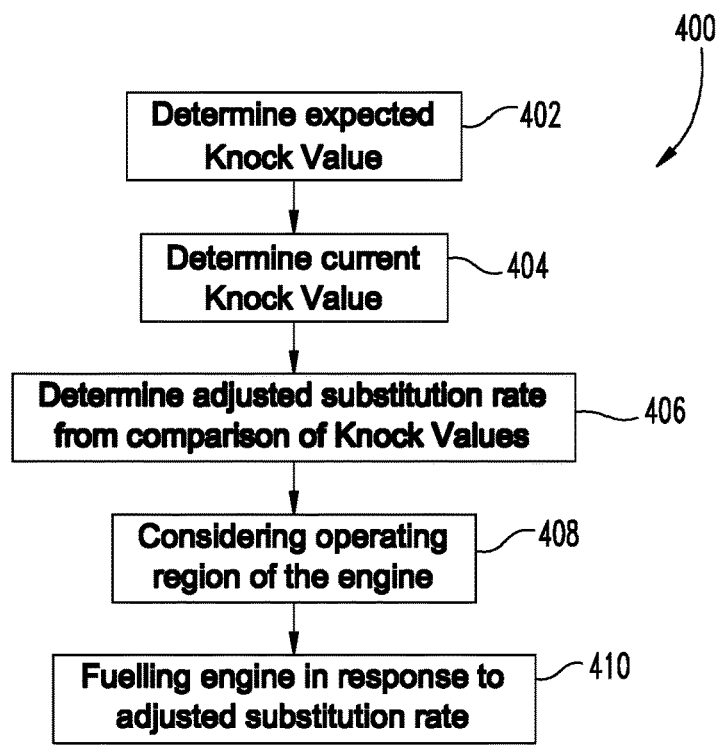
FIG. 4 is a flow diagram of a procedure for duel fuel operation of an internal combustion engine.

Referring to FIG. 4, there is shown one embodiment of a procedure 400 for operating dual fuel engine 30 with a liquid fuel from first fuel source 102 and a gaseous fuel from second fuel source 104. In one embodiment, the procedure 400 is implemented by processing subsystem 300. Procedure 400 includes an operation 402 to determine an expected knock value for the gaseous fuel in dual fuel engine 30. Procedure 400 further includes an operation 404 to determine a current knock value for the gaseous fuel in dual fuel engine. In one embodiment, the current knock value is determined by fueling dual fuel engine 30 with an amount of the gaseous fuel that is greater than a requested amount of the gaseous fuel. The requested amount of the gaseous fuel can include one or more of an amount of the gaseous fuel indicated by a nominal substitution rate of gaseous fuel for liquid fuel, and an amount of the gaseous fuel indicated by a substitution rate in use before the adjusted substitution rate.

Procedure 400 continues at operation 406 to determine an adjusted substitution rate for the gaseous fuel in response to comparing the expected knock value and the current knock value. Operation 406 may further include fuelling the dual fuel engine 30 with an amount of the gaseous fuel in response to the adjusted substitution rate. Procedure 400 may further include an operation 408 to consider the operating region of the dual fuel engine, and to associate data regarding the expected knock value, the current knock value, the nominal substitution rate, the current substitution rate, and the adjusted substitution rate with the operating region of the engine at the time the data is utilized. The operating region of the engine can be indicated by one or more operating parameters, such as engine speed, engine load, charge flow rate, air flow rate, IMT, EMT, IMP, EMP, EGR temperature, oxygen amount, and oxygen fraction.

In another embodiment, the current knock value is determined by observing a knock event. A current substitution rate of the gaseous fuel for the liquid fuel that is not expected to incur the knock event is then determined for the adjusted substitution rate. The adjusted substitution rate can further be determined by observing a current knock event and reducing a substitution rate until the knock event is no longer observed so that the reduced substitution rate which does not cause the knock event can be determined and the adjusted substitution rate can be determined from the determined reduced substitution rate.

In a further embodiment of procedure 400, operation 406 to determine the adjusted substitution rate for the gaseous fuel includes determining an effective fuel substitution rate for the gaseous fuel. The effective fuel substitution rate for the gaseous fuel includes a first amount of gaseous fuel that provides an amount of effective torque equivalent to a second amount of a liquid fuel. The effective fuel substitution rate is distinct from a nominal fuel substitution rate.

Figure 5:
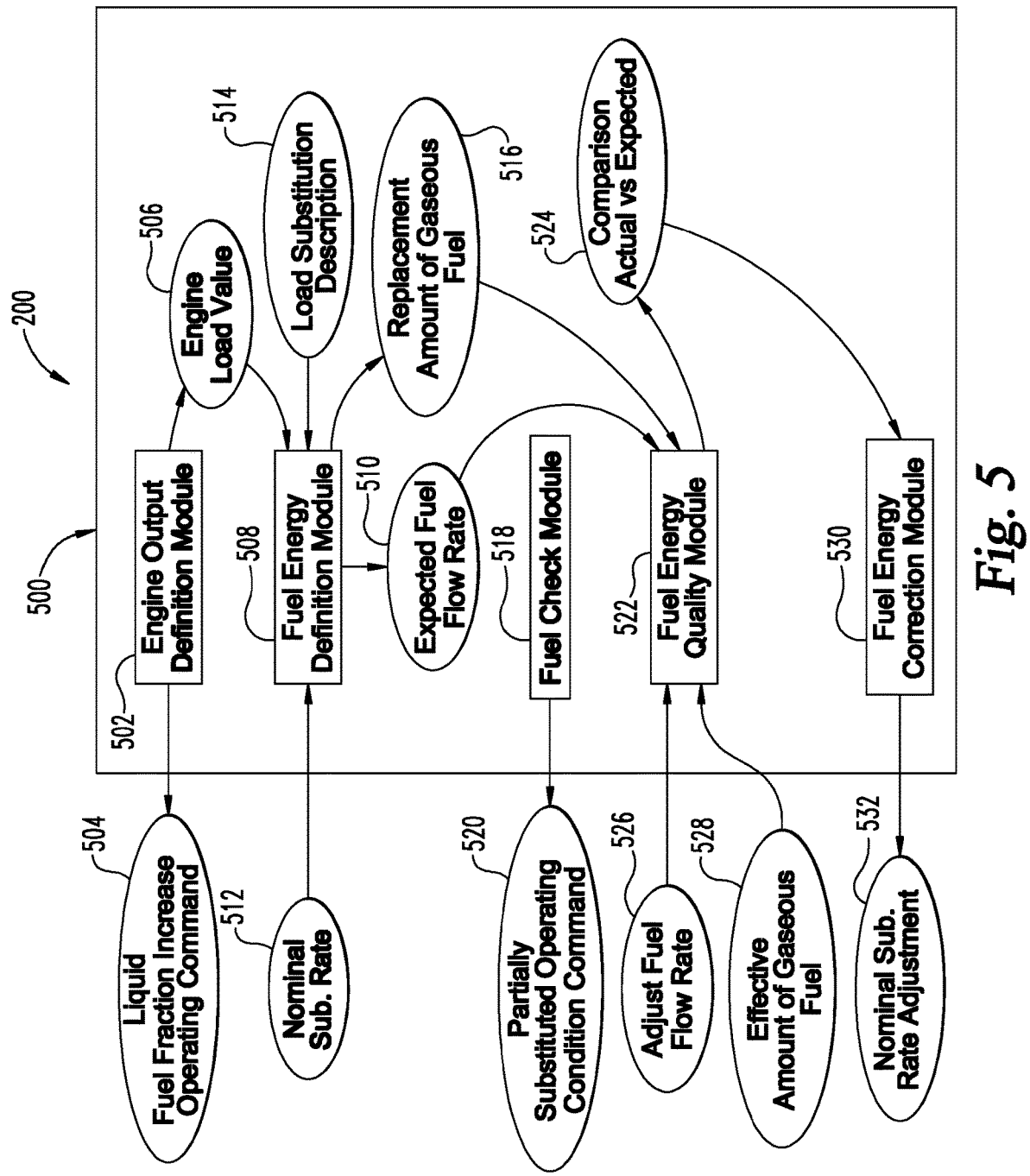
FIG. 5 is a schematic of another embodiment control apparatus for duel fuel operation of an internal combustion engine.

FIG. 5 is a schematic illustration of another embodiment processing subsystem 500 of controller 200 which is operable to determine the energy content of the gaseous fuel by using the liquid fuel of known energy content to determine the energy demand of the dual fuel engine and controlling operations of duel fuel engine 30 in response. Processing subsystem 500 includes an engine output definition module 502 structured to output a liquid fuel fraction increase operating command 504 to operate dual fuel engine 30 at one of an increased liquid fuel fraction from first fuel source 102 and a 100% liquid fuel fraction from first fuel source 102. Engine output definition module 502 is further structured to determine an engine load value 506 while operating at the increased liquid fuel fraction or 100% liquid fuel fraction. In one embodiment, engine output definition module 502 is further structured to operate dual fuel engine 30 at an increased liquid fuel fraction by reducing a gaseous fuel flow rate from a nominal gaseous fuel flow rate determined according to the nominal substitution rate. In a further embodiment, the gaseous fuel flow rate is reduced from the nominal gaseous fuel flow rate by one of a predetermined amount and a detectable amount.

Subsystem 500 also includes a fuel energy definition module 508 structured to determine an expected fuel flow rate 510 in response to a nominal substitution rate 512 of the gaseous fuel for the liquid fuel at the engine load value 506 and a load substitution description 514. The expected fuel flow rate 510 includes one of a gaseous fuel rate and a resulting liquid fuel rate. The load substitution description 514 includes a replacement amount of gaseous fuel 516 that provides an amount of torque equivalent to a replaced amount of a liquid fuel.

Subsystem 500 includes a fuel check module 518 structured to determine operating conditions suitable for a partially substituted operating condition command 520 to operate the dual fuel engine 30 at a partially substituted operating condition where a third amount of the liquid fuel is substituted with a fourth amount of the gaseous fuel. A fuel energy quality module 522 is structured to output a comparison 524 of an actual versus expected operating condition. In one embodiment, the comparison is made between the resulting or actual liquid fuel rate 526 and the expected fuel flow rate 510. In another embodiment, the comparison is made between an effective gaseous fuel flow rate 528 and the replacement amount of the gaseous fuel 516 that was expected to occur. Subsystem 500 further includes a fuel energy correction module 530 structured to determine a nominal substitution rate adjustment 532 that adjusts the nominal substitution rate in response to the comparison 524.

Figure 6A:
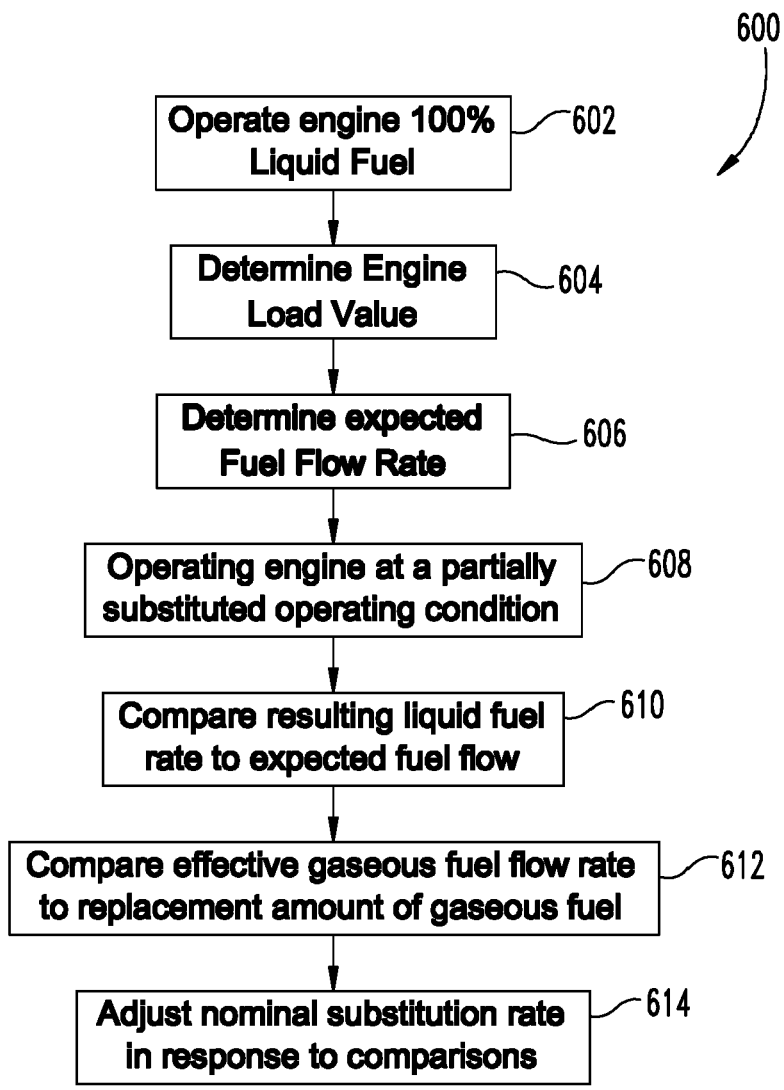
FIG. 6A is a flow diagram of another embodiment procedures for duel fuel operation of an internal combustion engine.

Referring to FIG. 6A, there is shown another embodiment of a procedure 600 for operating dual fuel engine 30 with a liquid fuel from first fuel source 102 and a gaseous fuel from second fuel source 104. In one embodiment, the procedure 600 is implemented by processing subsystem 500 described above. Procedure 600 includes an operation 602 to operate dual fuel engine 30 on 100% liquid fuel from first fuel source 102 where a first amount of liquid fuel is substituted for a second amount of gaseous fuel, and an operation 604 to determine an engine load value in response to operation 602. Procedure 600 further includes an operation 606 to determine an expected fuel flow rate in response to a nominal substitution rate of gaseous fuel for liquid fuel, a load substitution description, and the engine load value. The expected fuel flow rate includes one of a gaseous fuel rate and a resulting liquid fuel rate, and the load substitution description includes a replacement amount of gaseous fuel that provides an amount of torque equivalent to a replaced amount of a liquid fuel.

Procedure 600 continues at an operation 608 to operate the dual fuel engine at a partially substituted operating condition where a third amount of the liquid fuel is substituted with a fourth amount of the gaseous fuel. At operation 610 a comparison of one of the resulting liquid fuel rate to the expected fuel flow rate is made, and at operation 612 a comparison of an effective gaseous fuel flow rate to the replacement amount of the gaseous fuel is made. Procedure 600 continues at operation 614 to adjust the nominal substitution rate in response to the comparisons from at least one of operations 610 and 612. In one embodiment, operation 614 includes adjusting one of the nominal substitution rate and the load substitution description in response to the effective gaseous flow rate and the replacement amount of the gaseous fuel. In another embodiment, operation 614 includes adjusting one of the nominal substitution rate and the load substitution description in response to the expected fuel flow rate and the third amount of the liquid fuel.

In another embodiment of procedure 600, operation 602 includes operating dual fuel engine 30 on a first gaseous fuel amount that is less than the gaseous fuel amount indicated by a nominal substitution rate by a predetermined amount and on a second liquid fuel amount. Operation 606 includes determining an expected fuel flow rate in response to a nominal substitution rate, a load substitution description and the predetermined amount. This embodiment further includes operating the dual fuel engine at a partially substituted operating condition where a third amount of the liquid fuel is substituted with a fourth amount of the gaseous fuel, and the partially substituted operating condition includes a greater amount of the gaseous fuel than the first gaseous fuel amount.

Figure 6B:
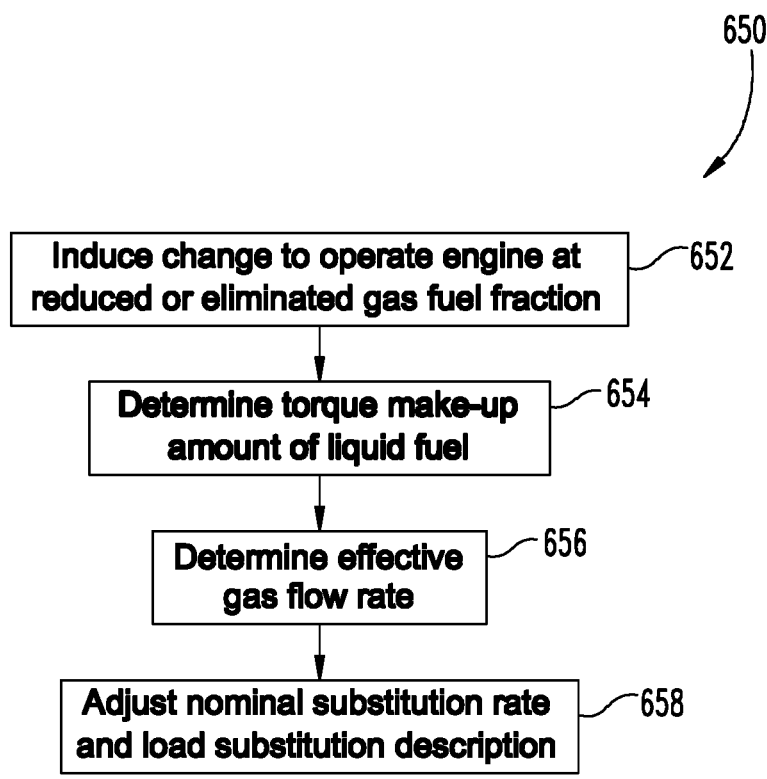
FIG. 6B a flow diagram of a further embodiment procedure for duel fuel operation of an internal combustion engine.

Referring now to FIG. 6B, another embodiment procedure 650 includes an operation 652 to induce a change in the dual fuel engine 30 to operate at a prescriptively reduced or eliminated gas fuel fraction. In one embodiment, the procedure 650 is implemented by processing subsystem 500. Procedure 650 includes an operation 654 to determine a torque make up amount of liquid fuel utilized to maintain at least one of an engine speed, an engine load, and an engine power after completion of operation 652. Procedure 650 continues at operation 656 to determine an effective gas flow rate in response to the torque make up amount of liquid fuel and the prescriptively reduced or eliminated gas fuel fraction, and an operation 658 to adjust at least one of a nominal substitution rate of the gaseous fuel and a load substitution description in response to the effective gas flow rate.

Figure 7:
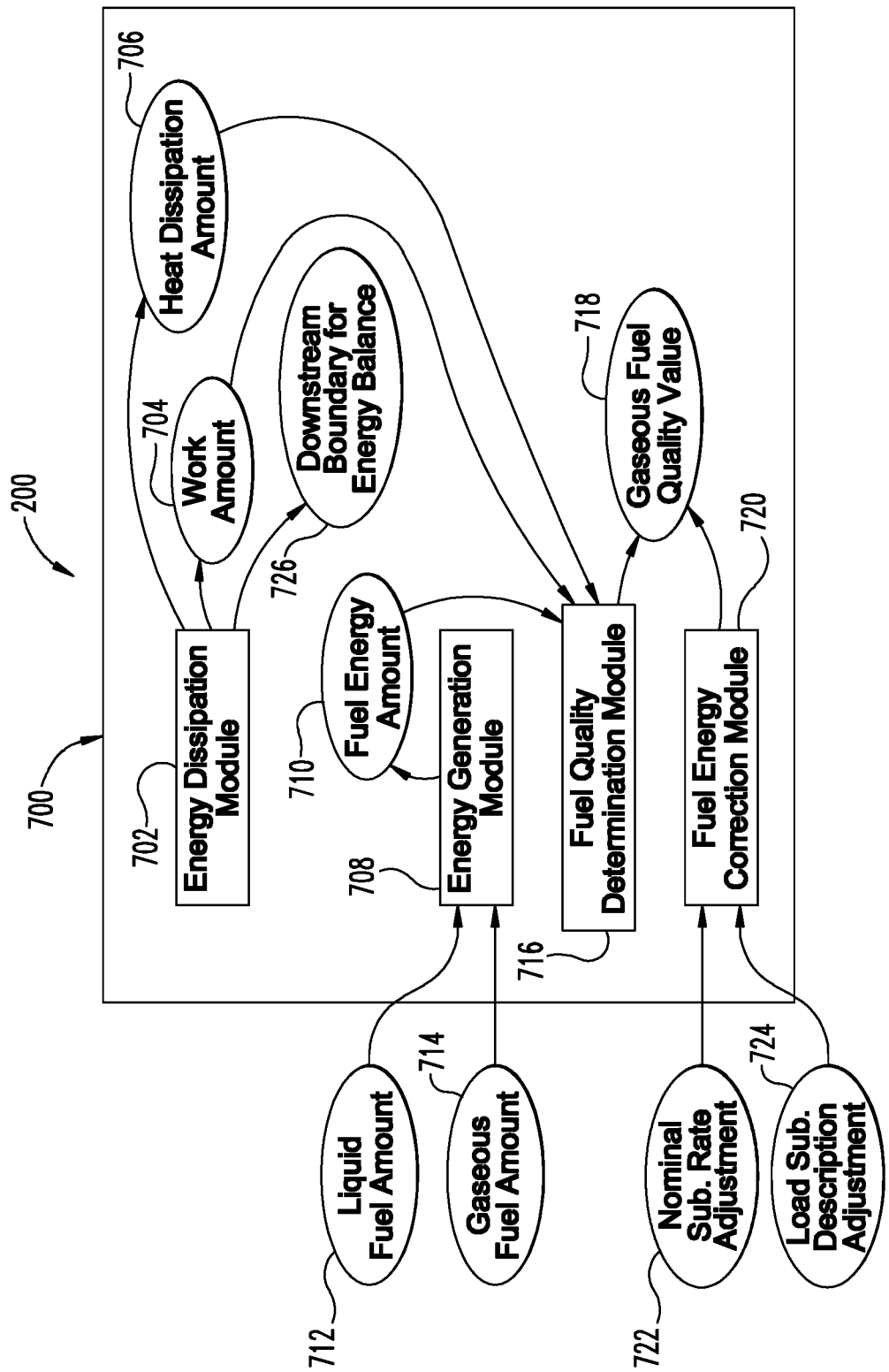
FIG. 7 is a schematic of another embodiment control apparatus for duel fuel operation of an internal combustion engine.

FIG. 7 is a schematic illustration of another embodiment processing subsystem 700 of controller 200 for controlling the gaseous fuelling rate by determining the heat energy of the gaseous fuel and controlling operations of duel fuel engine 30 in response. Processing subsystem 700 includes an energy dissipation module structured 702 to determine a first work amount 704 for an operating duel fuel engine 30 and a first heat dissipation amount 706 for the operating dual fuel engine 30. Subsystem 700 includes an energy generation module 708 structured to determine a fuel energy amount 710 for the operating dual fuel engine 30 in response to a liquid fuel amount 712 and a gaseous fuel amount 714.

Subsystem 700 further includes a fuel quality determination module 716 structured to determine a gaseous fuel quality value 718 and/or a parameter representative thereof in response to the fuel energy amount 710, the first heat dissipation amount 706, the first work amount 704, the liquid fuel amount 712, and the gaseous fuel amount 714. In embodiment, the heat energy of the engine is determined from the exhaust temperature and mass flow of the exhaust, and the heat energy and brake specific horsepower of the engine are used to determine the fuel energy amount of the first and second fuel amounts 712, 714. The contribution of the liquid fuel to the fuel energy is constant, so variations in the fuel energy amount are attributed to the quality of the gaseous fuel. A fuel energy correction module 720 is structured to adjust at least one of a nominal substitution rate 722 and a load substitution description 724 of the gaseous fuel in response to the gaseous fuel quality value 718.

In one embodiment, dual fuel engine includes a sensor 82 (FIG. 1) that is configured to provide an output signal indicative of a heat transfer environment of engine 30, and subsystem 700 is configured to determine if engine 30 is operating in a nominal heat transfer environment. In a further embodiment, turbocharger 46 has a turbine side including turbine 48 disposed in an exhaust gas stream of engine 30, and the energy dissipation module 702 is structured to define a downstream boundary for energy balance 726 for system 100 at an upstream side of the turbine 48. In another embodiment, energy dissipation module 702 is structured to define the downstream boundary for system energy balance 726 at a downstream side of the turbine 48.

Figure 8:
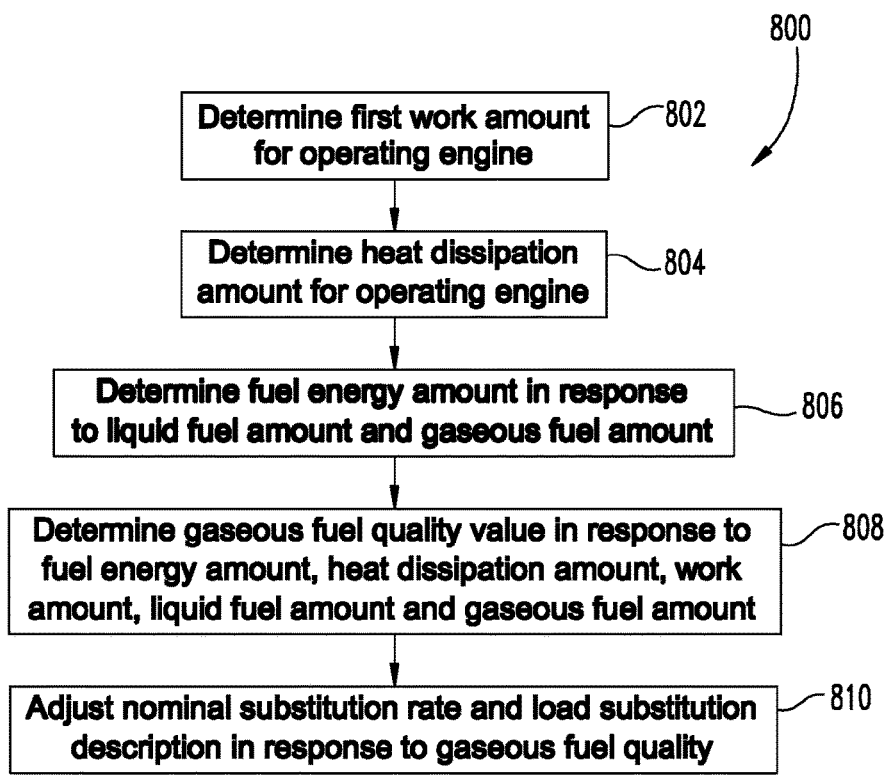
FIG. 8 is a flow diagram of another embodiment procedures for duel fuel operation of an internal combustion engine.

Referring to FIG. 8, there is shown another embodiment of a procedure 800 for operating dual fuel engine 30 with a liquid fuel from first fuel source 102 and a gaseous fuel from second fuel source 104. In one embodiment, the procedure 800 is implemented by processing subsystem 700. Procedure 800 includes an operation 802 to determine a first work amount for an operating dual fuel engine 30. Procedure 800 further includes an operation 804 to determine a first heat dissipation amount for the operating dual fuel engine 30. In one embodiment, the heat dissipation amount is determined by a determination that an excess thermal energy amount is present in an exhaust gas of the engine.

Procedure 800 includes an operation 806 to determine a fuel energy amount for the operating dual fuel engine 30 in response to a liquid fuel amount and a gaseous fuel amount. In one embodiment, the fuel energy amount is determined in response to determining the dual fuel engine 30 is operating in a nominal heat transfer environment. In a further embodiment, determining the fuel energy amount includes performing a system energy balance, and defining a downstream boundary of the system at one of upstream of a turbine and downstream of a turbine.

Procedure 800 continues at an operation 808 to determine a gaseous fuel quality value or parameter representative thereof in response to the fuel energy amount, the first heat dissipation amount, the first work amount, the liquid fuel amount, and the gaseous fuel amount. Procedure 800 continues at operation 810 to adjust at least one of a nominal substitution rate and a load substitution description in response to the gaseous fuel quality value. Operation 810 can further include operations to adjust the at least one of the nominal substitution rate and the load substitution description to compensate for an engine knock effect, operations to adjust the at least one of the nominal substitution rate and the load substitution description to compensate for a fuel injector tip temperature effect, and operations to adjust the at least one of the nominal substitution rate and the load substitution description to compensate for an exhaust gas temperature effect.

In a further embodiment of procedure 800, the duel fuel engine is determined to be operating in a nominal heat transfer environment in response to at least one of determining that an engine coolant temperature is within a predetermined range (inclusive), determining that an ambient air temperature is within a predetermined range (inclusive), and determining that a vehicle speed is within a predetermined range (inclusive).

Figure 9:
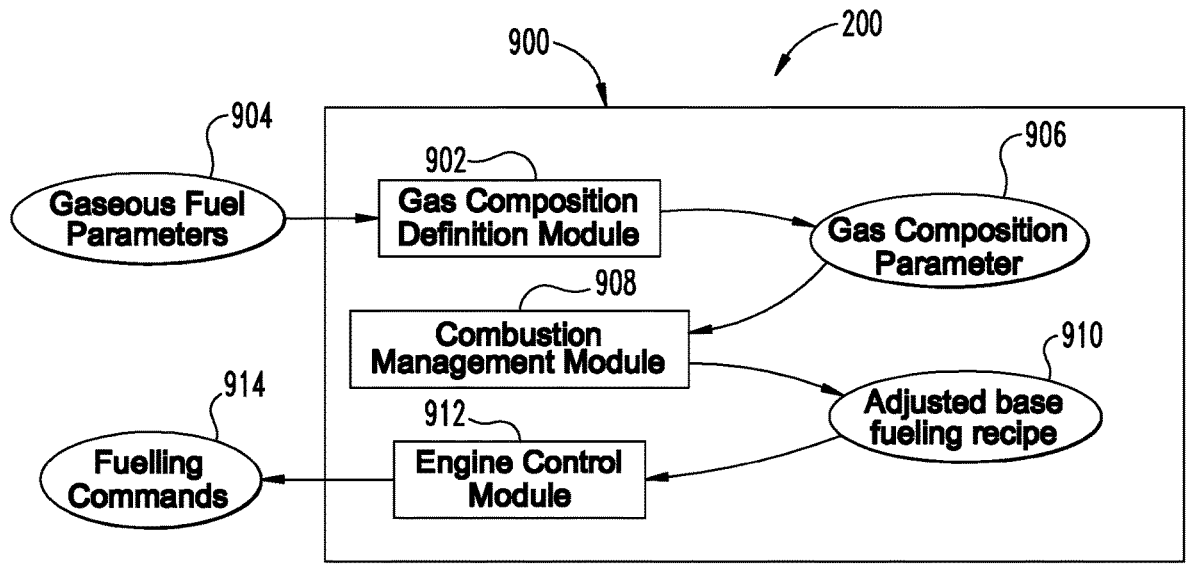
FIG. 9 is a schematic of another embodiment control apparatus for duel fuel operation of an internal combustion engine.

FIG. 9 is a schematic illustration of another embodiment processing subsystem 900 of controller 200 that adjusts engine operating parameters of duel fuel engine 30 in response to gaseous fuel quality. Processing subsystem 900 includes a gas composition definition module 902 structured to receiver an input of gaseous fuel parameters 904 and to determine a gas composition parameter 906 for the gaseous fuel provided to dual fuel engine 30. The gas composition parameter 906 includes at least one parameter that is a fuel energy content description and/or a knock tendency description. Subsystem 900 further includes a combustion management module 908 structured to provide an adjusted base fueling recipe 910 in response to the gas composition parameter 906 to reduce, eliminate or avoid operating conditions in which knock, reduced engine power output, or other situations are likely to occur.

The adjusted base fueling recipe 910 includes one or more parameters adjusted for gaseous fuel quality, including a gaseous fuel substitution rate, an air-fuel-ratio, a liquid fuel injection timing, a liquid fuel injection pressure, a valve timing selection, an oxygen fraction value, an oxygen amount value, an EGR flow rate value, an EGR fraction value, an IMT value, an IMP value, a charge flow value, and a charge temperature value. Subsystem 900 further includes an engine control module 912 structured to output a fuelling command 914 that provides a first amount of the gaseous fuel from second fuel source 104 and a second amount of a liquid fuel from first fuel source 102 to the internal combustion engine in response to the adjusted base fueling recipe 910.

Figure 10:
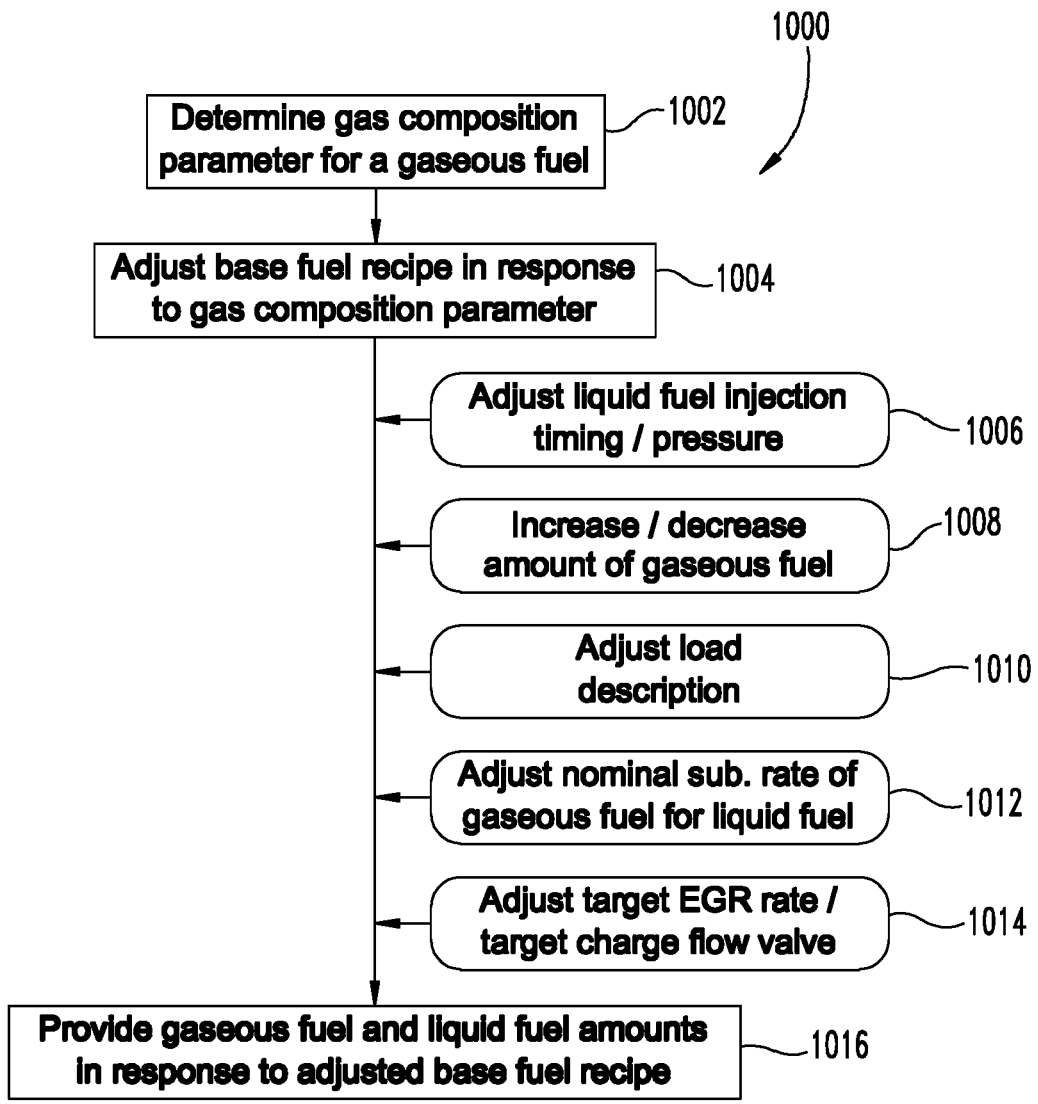
FIG. 10 is a flow diagram of another embodiment procedures for duel fuel operation of an internal combustion engine.

Referring to FIG. 10, there is shown another embodiment of a procedure 1000 for operating dual fuel engine 30 with a liquid fuel from first fuel source 102 and a gaseous fuel from second fuel source 104. In one embodiment, the procedure 1000 is implemented by processing subsystem 900. Procedure 1000 includes an operation 1002 to determine a gas composition parameter for the gaseous fuel provided to dual fuel engine 30. The gas composition parameter includes at least one of a fuel energy content description and a knock tendency description. In one embodiment, the fuel energy content description indicates a fuel energy content of the gaseous fuel that is higher or lower than a nominal fuel energy value of the gaseous fuel. In a further embodiment, the knock tendency description indicates a methane number that is higher or lower than a nominal methane number for the gaseous fuel.

Procedure 1000 continues at operation 1004 to adjust the base fuelling recipe in response to the gas composition parameter. Operation 1004 can include an operation 1006 that adjusts the base fuelling recipe by adjusting a liquid fuel injection timing and/or pressure in response to a knock tendency indicator indicating a methane number higher or lower than a nominal methane number for the gaseous fuel. Operation 1004 can also include an operation 1008 that adjusts the base fuelling recipe by adjusting by increasing or decreasing of the amount of the gaseous fuel provided to the engine in response to the fuel energy content being lower or higher, respectively, than the nominal fuel energy value of the gaseous fuel. Operation 1004 can include an operation 1010 that adjusts the base fuelling recipe by adjusting a load substitution description, an operation 1012 that adjusts the base fuelling recipe by adjusting a nominal substitution rate of the gaseous fuel for the liquid fuel, and/or an operation 1014 that adjusts the base fuelling recipe by adjusting at least one of a target EGR rate and a target charge flow value in response to the fuel energy content being higher of lower than the nominal fuel energy content, and/or in response to the methane number being higher or lower than the nominal methane number. Procedure 1000 continues at operation 1016 to provide a first amount of the gaseous fuel from second fuel source 104 and a second amount of the liquid fuel from first source 102 to dual fuel engine 30 in response to the adjusted base fueling recipe.

Figure 11:
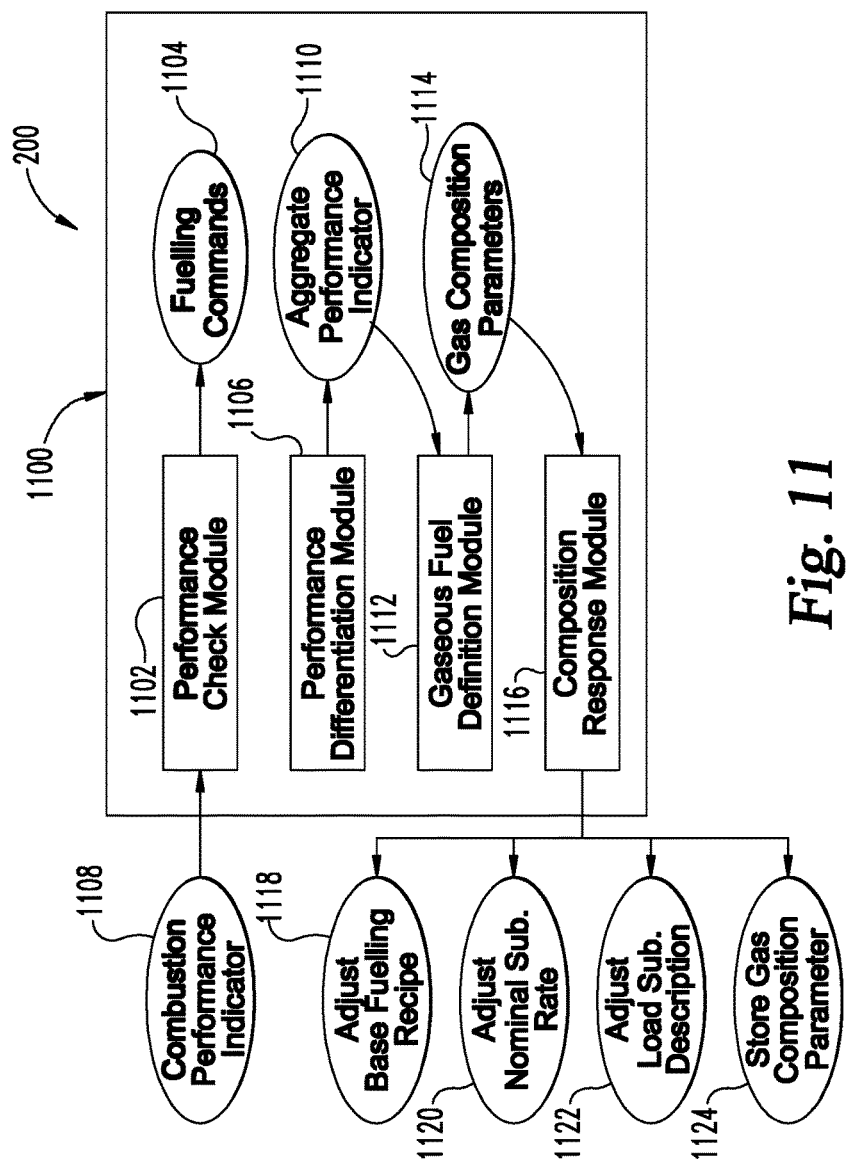
FIG. 11 is a schematic of another embodiment control apparatus for duel fuel operation of an internal combustion engine.

FIG. 11 is a schematic illustration of another embodiment processing subsystem 1100 of controller 200 for evaluating a quality of the gaseous fuel and adjust operations of dual fuel engine 30 in response to the same. Processing subsystem 1100 includes a performance check module 1102 structured to output a fuelling command 1104 the fuelling system 21 to provide only liquid fuel from first fuel source 102 to a first one of the combustion chambers of cylinder 31, and to provide both gaseous fuel and liquid fuel to the remaining combustion chambers of cylinders 31. Subsystem 1100 further includes a performance differentiation module 1106 structured to interpret a combustion performance indicator

1108 associated with the first combustion chamber and its differentiation with the combustion performance in the remaining cylinders 31, and to interpret an aggregate performance indicator 1110. The aggregate performance indicator 1110 includes at least one of a bulk exhaust gas temperature, an average combustion event torque contribution, a modeled combustion event parameter, and a predetermined combustion event parameter stored in a non-transient memory location.

Subsystem 1100 further includes a gaseous fuel definition module 1112 structured to determine a gas composition parameter 1114 in response to the combustion performance indicator 1108 and the aggregate performance indicator 1110. A composition response module 1116 is structured to, in response to the gas composition parameter 1114, to output one or commands to perform at least one operation that includes adjusting a base fuelling recipe 1118, to adjust a nominal substitution rate 1120, to adjust a load substitution description 1122, and/or to store the gas composition parameter 1124 such as in a non-transient memory location of controller 200. In one embodiment, the load substitution description is a replacement amount of the gaseous fuel that provides an amount of torque equivalent to the replaced amount of the liquid fuel.

In one embodiment, the composition response module 1116 is further structured to adjust the base fueling recipe by outputting a command that adjusts at least one of a target EGR rate and a target charge flow value, a liquid fuel injection timing of liquid fuel from first fuel source 102, and/or a liquid fuel injection pressure. In another embodiment, the composition response module 1116 to determine the gas composition parameter 1114 indicates at least one of an increased knock tendency and a reduced methane number of the gaseous fuel. In response to this determination, the composition response module 1116 outputs a command to perform at least one of retarding a liquid fuel injection timing, reducing a liquid fuel injection pressure, increasing a gaseous phase air-fuel-ratio by increasing a fresh air flow rate to the intake system, and increasing a gaseous phase air-fuel-ratio by decreasing an amount of the gaseous fuel.

In one embodiment, the combustion performance indicator 1108 is output by a performance isolation device 84 (FIG. 2) that is associated with combustion chamber 33*a* of cylinder 31*a* and structured to determine the combustion performance indicator. The combustion performance indicator of cylinder 31*a* is at least partially isolated from the combustion performance of the remaining ones of the plurality of the combustion chambers of cylinders 31. The performance isolation device 84 can be a temperature sensor positioned to determine an exhaust gas temperature of the combustion chamber 33*a*. In another embodiment, performance isolation device 84 is a temperature sensor positioned to determine an exhaust gas temperature of the plurality of combustion chambers for cylinders 31, where the temperature of the exhaust gas from combustion chamber 33*a* is preferentially weighted. In yet another embodiment, the performance isolation device is a temperature sensor positioned to determine an in-cylinder temperature of the combustion chamber 33*a* of cylinder 31*a*. In yet another embodiment, performance isolation device 84 is an accelerometer structured to determine a torque contribution of the combustion chamber 33*a*. In still another embodiment, performance isolation device 84 is a pressure sensor positioned to determine an in-cylinder pressure of combustion chamber 33*a*.

Figure 12:
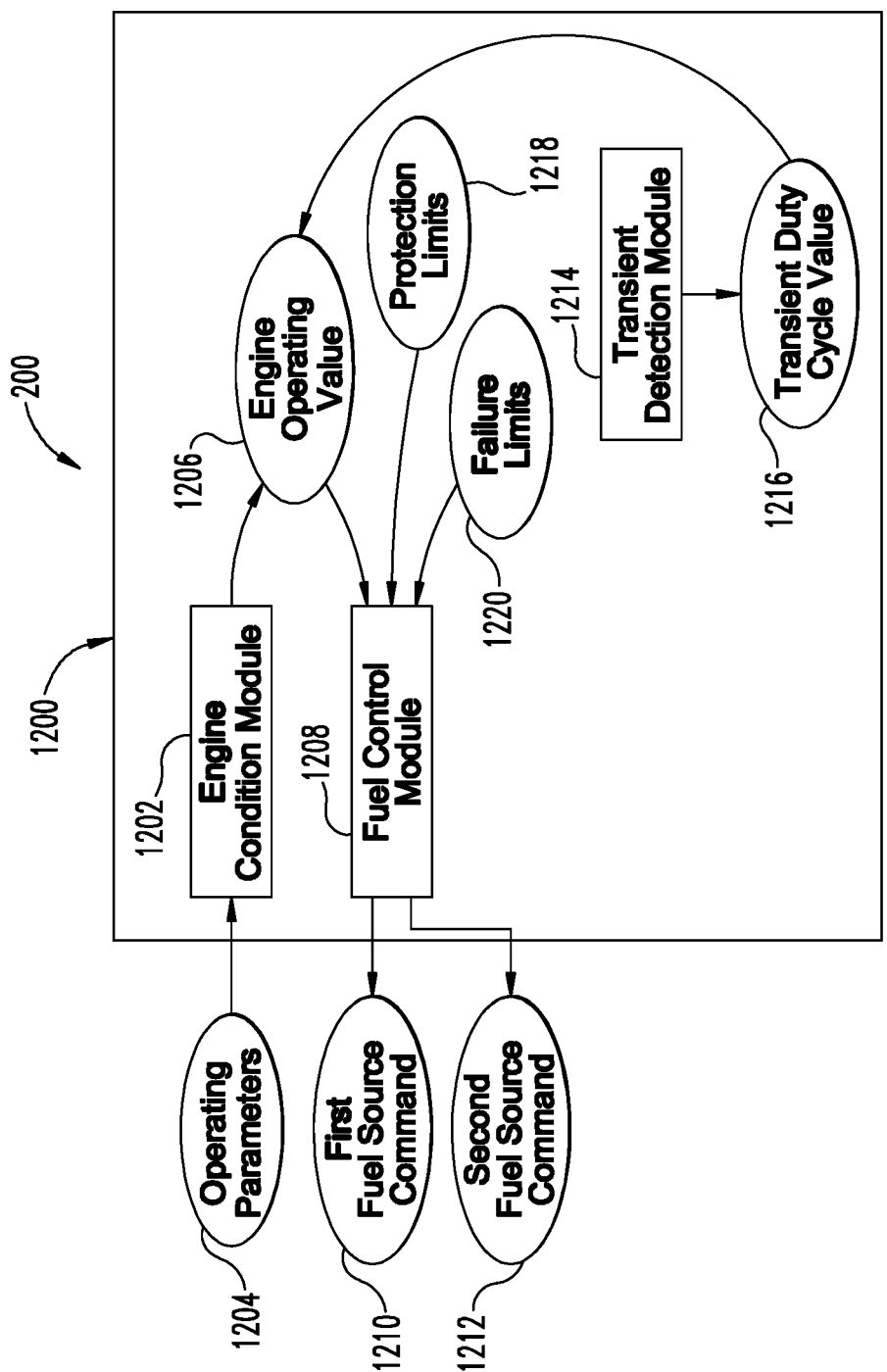
FIG. 12 is a schematic of another embodiment control apparatus for duel fuel operation of an internal combustion engine.

FIG. 12 is a schematic illustration of another embodiment processing subsystem 1200 of controller 200. Processing subsystem 1200 includes an engine condition module 1202 structured to receive operating parameters 1204 associated with operation of dual fuel engine 30 and interpret an engine operating value 1206. Subsystem 1200 further includes a fuel control module 1208 structured to provide, in response to the engine operating value 1206, at least one first fuel source command 1210 to first fuel source 102 and at least one second fuel source command 1212 to second fuel source 104 such that a first ratio of the diesel liquid fuel to the gaseous fuel (d1:g1) in a first one of the cylinders 31 is distinct from a second ratio of the diesel fuel to the gaseous fuel (d2:g2) in the a second one or more of the cylinders 31.

In one embodiment, the engine operating value 1206 is a fuel injector tip temperature value of injector 116*a*. Fuel control module 1208 is structured to increase the ratio d1:g1 to reduce the fuel injector tip temperature value for the injector tip of injector 116*a* in the first cylinder 31*a*. In a further embodiment, fuel control module 1208 is further structured to alternate increased diesel fuel ratios between cylinders 31, to reduce the fuel injector tip temperature values corresponding to the injector tips of the injector 116 of each of the cylinders 31.

In another embodiment, the second fuel system associated with second fuel source 104 includes one of gaseous port injection and gaseous direct injection for delivery of gaseous fuel. The engine operating value 1206 is a gaseous injector failure value defined by one or more of protection limits 1218 and failure limits 1220 corresponding to a first one of the cylinders 31, and the fuel control module 1208 is structured to modify the ratio d1:g1 in response to the gaseous injector failure value. Fuel control module 1208 can further be structured to increase a diesel fueling amount to the first one of the cylinders 31 in response to the gaseous injector failure value indicating a gaseous fuel injector operationally coupled to the respective cylinder 31 is delivering less than a scheduled fueling amount of gaseous fuel. Fuel control module 1208 can also be structured to increase a gaseous fueling amount in the remaining cylinders 31 in which a gaseous fuel injector failure is not indicated to maintain an overall substitution rate of gaseous fuel for liquid fuel. Fuel control module 1208 further be structured to decrease a diesel fueling amount to the respective cylinder 31 in response to the gaseous injector failure value indicating a gaseous fuel injector operationally coupled to the cylinder 31 is delivering greater than a scheduled fueling amount of gaseous fuel.

In another embodiment, the fuel control module 1208 is structured to provide the first fuel source command to first fuel source 102 such that one of the cylinders 31 is fully fueled with diesel in response to an engine operating value 1206 that is an emissions value. The emissions value can include one or more of an aftertreatment component regeneration request, an unburned hydrocarbons value, and an exhaust temperature value.

In another embodiment, subsystem 1200 includes a transient detection module 1214 structured to provide the engine operating value 1206 as a transient duty cycle value 1216. The transient detection module 1214 is further structured to provide the engine operating value 1206 by one or more of utilizing a high pass filtered load value of the engine 30, utilizing a derivative load value of the engine 30, utilizing a slope value of moving average engine load values 30, accepting an operator input indicating an upcoming transient, and interpreting a load schedule (e.g. a pump schedule) indicating an upcoming transient.

In one embodiment, where the dual fuel engine is employed in, for example, drilling applications, the transient detection module 1214 is configured to interpret a geological formation from a reference table, chart or other input, and locations in the geological formation that will or are predicted to induce transients spikes in engine output are identified. The substitution rate of gaseous fuel for liquid fuel can be proactively decreased in one or more of the cylinders 31 to provide greater liquid fuelling and improve the capability of the engine to response to the transient spikes. In another embodiment, dual fuel engine 30 includes multiple cylinder banks and one of the cylinder banks is fuelled at a lower substitution ratio to increase the liquid fuel amount in response to the detected or anticipated transient condition spike. In still another embodiment, a portion of the cylinders 31 are operated in a liquid fuel only mode and the remaining cylinders 31 are operated in a duel fuel mode. In yet another embodiment, a portion of the cylinders 31 are operated with a first substitution rate that is less than a substitution rate in the remaining cylinders.

Figure 13:
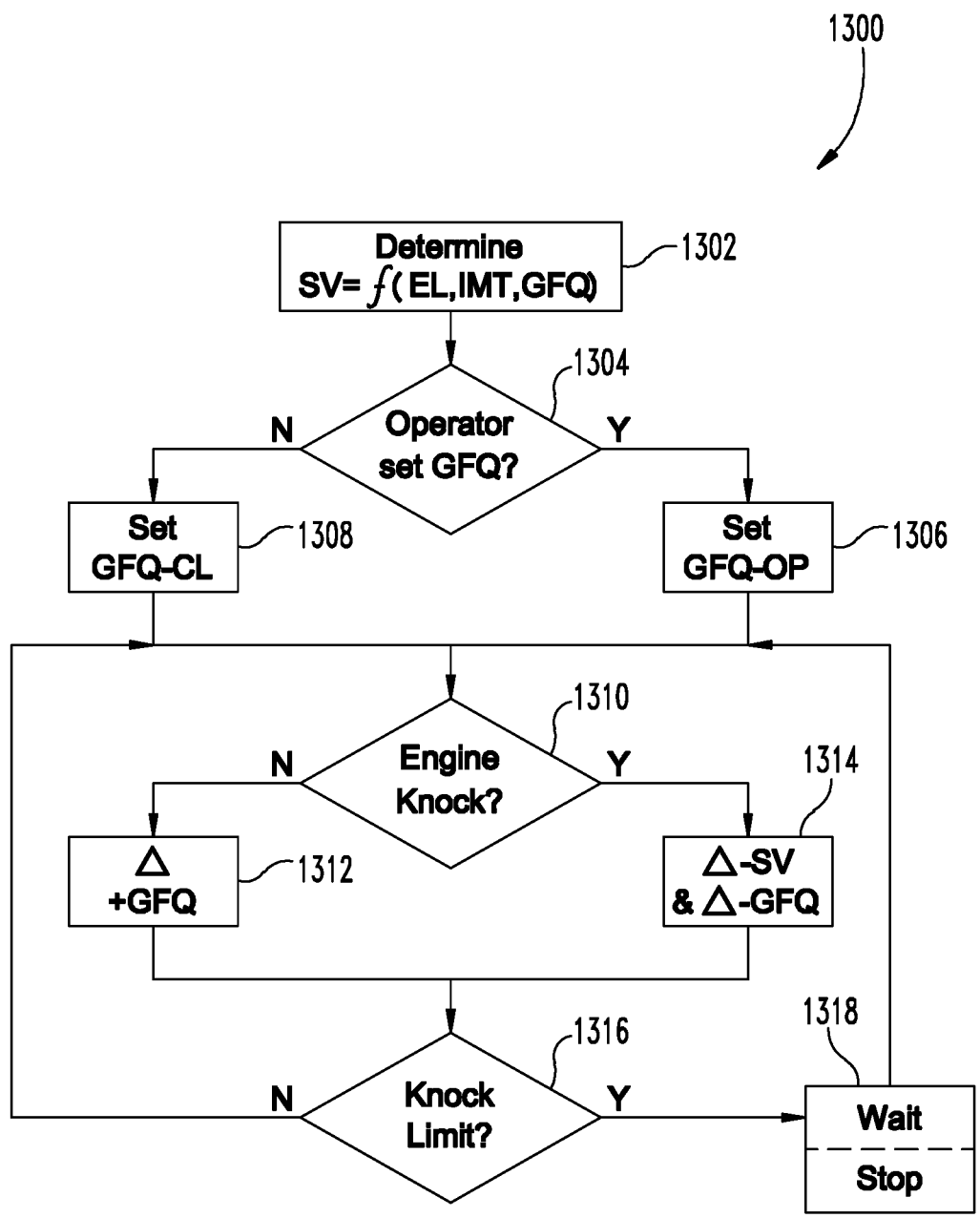
FIG. 13 is a flow diagram of an exemplary controls process.

With reference to FIG. 13 there is illustrated a flow diagram of an exemplary controls process 1300 for dual fuel substitution rate optimization in the presence of engine knock. Process 1300 begins at operation 1302 in which a target gaseous fuel substitution value is determined based upon engine load information, intake manifold temperature information, and gaseous fuel quality information. In a preferred embodiment, the determination is made using a set of three-dimensional tables which specify a plurality of discrete substitution rate values as a function of the engine load information, the intake manifold temperature information, and the gaseous fuel quality information. The set of tables may include two or more tables. Interpolation may be performed to provide substitution rate determinations between discrete table values. The gaseous fuel substitution values in the tables may be determined empirically such as by testing in a test cell and/or by analysis or modeling. The table values preferably consider the knock margin of the engine, as well as other parameters such as gas and component temperatures. The tables generally specify higher substitution rates for higher gaseous fuel quality values, lower intake manifold temperature values, lower engine loads values, and higher engine RPMs. The tables also preferably reduce the substitution rate at very low loads, where the engine does not run as well in dual fuel mode.

The engine load information may be expressed in a variety of units or terms including, for example, as a percentage of a rated engine load or maximum engine load or in terms of engine output power or output torque. The engine load information may be determined using one or more physical sensors, virtual sensors, engine models accounting for energy produced by combustion and losses associated with the engine, or combinations thereof. The intake manifold temperature information may be expressed in a number of units or terms including, for example, temperature values or percentages or indices relating thereto. The intake manifold temperature information may be determined using a one or more physical sensors, virtual sensors, models ambient temperature and added heat from intake charge compression or other heat sources, or combinations thereof. The gaseous fuel quality information may be expressed in a variety of units or terms including, for example, as a methane number, as a percentage of a rated or maximum energy content or as an energy content value. The gaseous fuel quality information may be determined based upon information provided by an operator, or may be determined using the techniques disclosed herein without a priori knowledge of the gaseous fuel quality and without external input into the system such as operator input.

In certain embodiments the engine load information is expressed as a percent engine load, the intake manifold temperature is expressed as a temperature value, and the gaseous fuel quality information is expressed as a methane number (MN). While these parameters may be utilized in the description herein, they are understood to be non-limiting examples. It shall be further understood that any parameters described herein may be transformed, approximated, estimated, or otherwise augmented or modified during various controller operations.

From operation 1302, process 1300 proceeds to conditional 1304 which determines whether the operator has provided gaseous fuel quality information or set a gaseous fuel quality value and/or parameter representative thereof. If conditional 1304 determines that the operator has provided gaseous fuel quality information or set a gaseous fuel quality value, process 1300 proceeds to operation 1306 which utilizes the operator provided or set gaseous fuel quality value. If conditional 1304 determines that the operator has not provided gaseous fuel quality information or set a gaseous fuel quality value, process 1300 proceeds to operation 1308 which sets a conservatively low initial value for gaseous fuel quality a starting point for optimization, for example, a methane number of 50 may be used.

From either operation 1306 or operation 1308, process 1300 proceeds to conditional 1310 which determines whether engine knock is detected. If conditional 1310 does not determine that engine knock is present, process 1300 proceeds to operation 1312 which increases the gaseous fuel quality value based on a programmable or calibratible rate, for example, increasing methane number by one every 10 seconds. If conditional 1310 detects engine knock, process 1300 proceeds to operation 1314 which reduces the gaseous fuel substitution value sharply (for example by 20-50% or more) to protect the engine and decreases the gaseous fuel quality value by a programmable or calibratible amount, for example, decreasing methane number by one. After a programmable delay or some other trigger, the algorithm increases the substitution rate again and targets the substitution rate indicated by the gaseous fuel quality value (for example one less than before).

From operations 1312 and 1314, process 1300 proceeds to conditional 1316 which evaluates whether a knock limit has been reached, for example, whether knock has been encountered a certain number of times. If conditional 1316 determines that a knock limit has been reached, process 1300 proceeds to operation 1318 which stops incrementing the gaseous fuel quality value if knock has been encountered a certain programmable number of times or, alternatively waits for a programmable amount of time or another event such as a key off, or gaseous fuel switching off before returning to conditional 1310 and allowing the gaseous fuel quality values to be incremented again.

Certain embodiments are configured to account for the possibility that at low engine loads the characteristics of diesel combustion may incorrectly trigger knock detection. To avoid reducing the substitution rate when it is not needed, an ignore zone conditional may be provided in process 1310, for example, immediately prior to conditional 1310 or conditional 1316. The ignore zone conditional evaluates whether the engine is operating in a region where it is known that the knock margin is more than sufficient, allowing the possibility of knock to be ruled out. The ignore zone may be a function of engine RPM, engine load and intake manifold temperature (e.g., low RPM and/or low intake manifold temperature). If apparent knock is detected in the ignore zone, the algorithm ignores the knock signal. At the edge of the ignore zone, the algorithm lowers its sensitivity to the knock signal (i.e. requires a stronger knock signal before it takes action).

Figure 14:
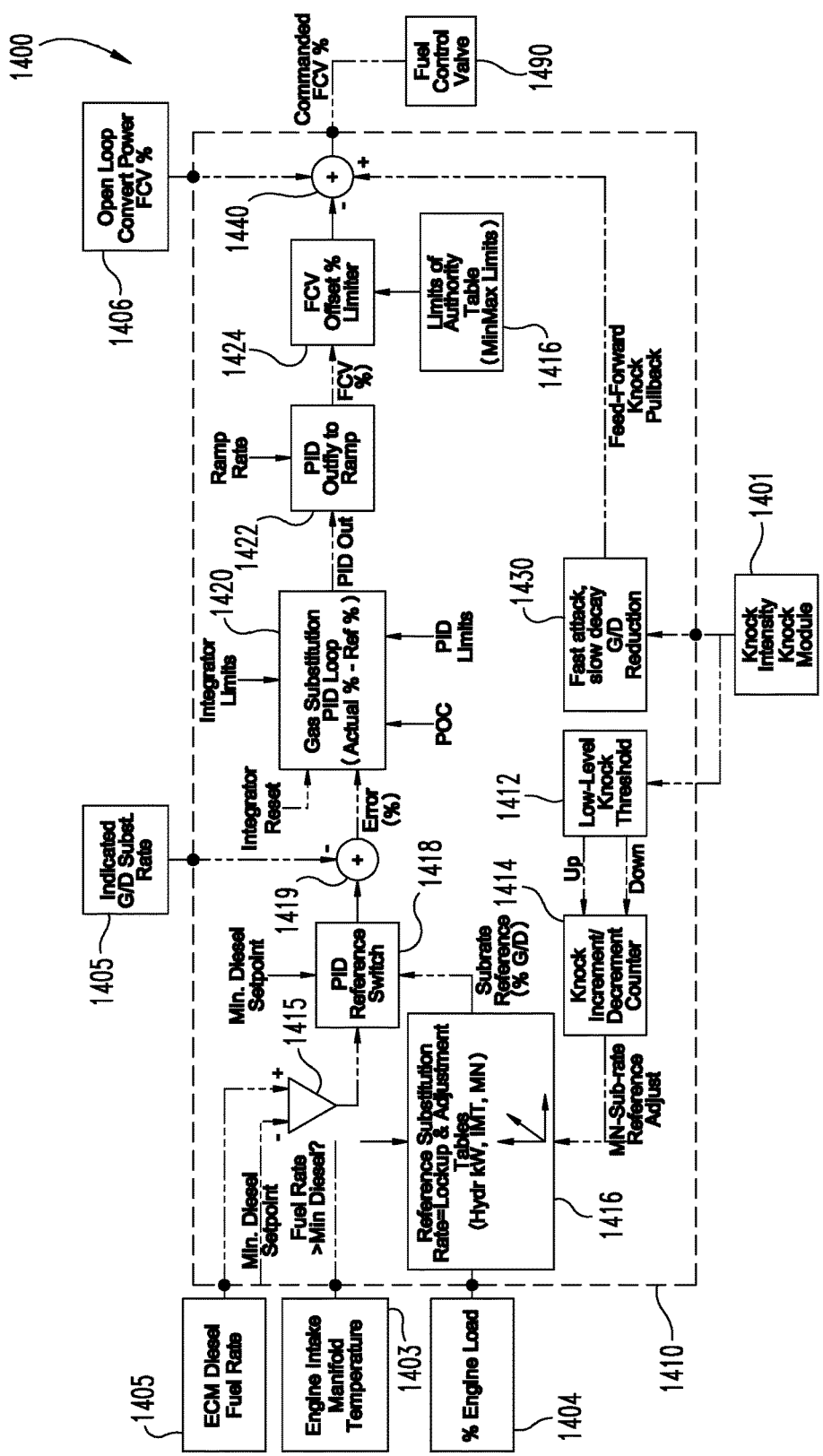
FIGS. 14-16 are block diagrams of exemplary controls apparatuses.

With reference to FIG. 14 there is illustrated a block diagram of exemplary controls 1400. Controls 1400 include three dimensional substitution rate reference tables 1416 which are structured to use an intake manifold temperature value 1403, a percent engine load value 1404, and a methane number (MN) value which is output by a knock increment/decrement counter block 1414 as inputs to determine and output a target substitution rate. Block 1414 determines a MN parameter based upon input from a low level knock threshold block 1412 which, in turn determines and provides to block 1414 an up or down value based upon input from knock intensity block 1401. A further example of MN determination controls is described in connection with FIG. 15 below.

Blocks 1402, 1415, and 1418 are structured to monitor the diesel fuel rate (or other liquid fuel rate). If the diesel fuel flow rate goes below a calibrated value, the closed-loop substitution rate PID reference is switched from the values determined from the three dimensional tables 1416 to a minimum diesel fueling setpoint. This is effective to maintain a minimum level of diesel fueling to ensure good gas combustion.

Block 1419 is structured to determine an error between a target substitution rate provided from block 1418 and an actual substitution rate 1405. This error is provided as an input to block 1420. Blocks 1420, 1422, 1424, 1406, 1416, 1430 and 1440 are structured to determine a gaseous fuel valve opening or position control parameter which is utilized to control gaseous fuel control valve 1490. More specifically block 1420 sets minimum and maximum authority table limits based upon input power. Block 1422 determines a valve control command based on a ramp rate and a PID output from block 1420 which, implements a gas substitution PID loop based upon the input substitution rate error. Block 1406 provides an open loop alternate input to set a valve control command. Block 1430 provides a feed forward knock pull back alternate input. It shall be appreciated that if the diesel fueling value is higher than the minimum value, the targeted PID reference comes from the three dimensional tables using percent engine load, intake manifold temperature and MN parameters. Within the limits of authority, the closed loop controls maintain the gas substitution rate to the percentage prescribed by the three dimensional tables.

It shall be appreciated that the controls 1400 utilize three-dimensional tables to vary the knock detection threshold as a function of engine load and intake manifold temperature. Since actual gas knock levels are determined primarily by engine load, gas methane number and intake manifold temperature a variable threshold can be used to ignore regions of engine operation where gas knock will not occur. This variable knock detection threshold also allows a consistent knock margin over the range of engine load and intake manifold temperature. It shall be further appreciated that controls 1400 provide control of gas fuel substitution values in the presence of diesel combustion noise.

Figure 15:
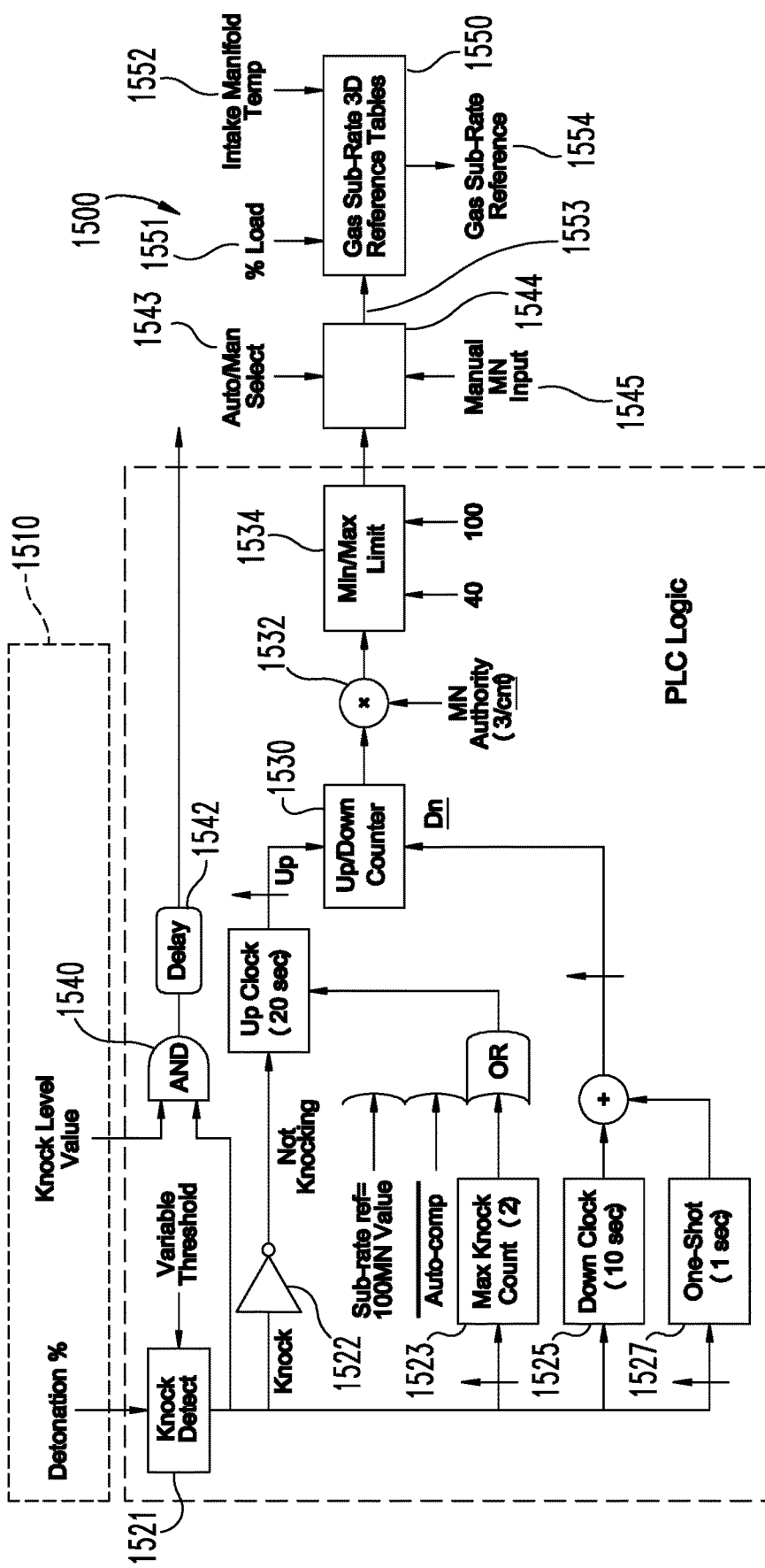

With reference to FIG. 15 there is illustrated a block diagram of controls 1500 which are structured to determine knock intensity and a gaseous fuel substitution rate value. Controls 1500 includes gaseous fuel substitution rate block 1550 which is structured to determine and output a gaseous fuel substitution rate value 1554 based upon a percent engine load input value 1551, an intake manifold temperature value 1552 and a gaseous fuel quality input value 1553 which is expressed in terms of methane number (MN) in the illustrated embodiment. In a preferred form block 1550 is structured to utilize a set of three dimensional gas substitution rate reference tables to determine the output value based upon the input values 1551, 1552, and 1553. This allows tailoring of the knock detection level to ignore regions of engine operation where knock will not occur. A knock feed-forward term and knock shutdown logic for heavy knock may also be utilized.

Gaseous fuel quality block rate block 1541 outputs gaseous fuel quality input value 1553 to gaseous fuel substitution rate block 1550. An operator input 1545 or separate controller input 1543 may selectably set block 1541 to utilizes a gaseous fuel quality value and/or parameter representative thereof external to the system, such as a value provided by the operator or controller or, alternatively, to utilize a gaseous fuel quality value and/or parameter representative thereof determined by block 1520. Block 1520, in turn, receives inputs from module 1510. More specifically, percent detonation information is provided to knock detect block 1521. In addition, a knock level value corresponding to a sufficiently severe knock amount such that gas is completely turned off and the engine returns to diesel only mode is provided to logical "AND" block 1540. Knock detect module 1521 interprets the detonation information relative to a threshold value and provides output to logical "AND" block 1540, logical "NOT" block 1522, and counters 1523, 1525, and 1527 which track the number of knock events and the time between knock events. For every knock event output by block 1521, the Max Knock Count of counter 1523 is increased and the MN Up/Down counter 1530 is decreased by one count. The output of the Up/Down counter 1530 is multiplied by the MN Authority scalar 1532 and the output is checked for a minimum and maximum value by the Min/Max Limit logic 1534.

The output MN parameter is provided to block 1540 and may be used to adjust the substitution rate reference table output. If the MN parameter increases, the substitution rate reference will increase and more gas will flow. If the MN parameter decreases, less gas will flow and the probability of knock will decrease. If knock continues, the Up/Down counter will continue to decease to lower the substitution rate to a level that eliminates gas knock. If more than "n" knock events occur (a calibration value, in this case set to 2) the Up/Down counter is inhibited so that the engine does not repeatedly try to raise the substitution rate level to a level where knock occurs. This eliminates the continuous cycling of the gas substitution rate that existed in the previous controls. Other criteria could be used to determine if the algorithm should attempt to look for a more accurate MN parameter; i.e. a fixed time delay, ECM Key Off or significant changes in operating condition or switching gas on or off. If the engine is in a constant knock condition and the knock signal is continuously at a logic 1 level, the programmable 10 second clock allows the Up/Down counter to continue to decrease the MN variable every 10 seconds and thus decrease the substitution rate to eliminate knock. Assuming that the maximum Knock Count value "n" has not been reached, the Up/Down counter value will increase by one count for every 20 second period (a programmable setpoint) where there is no knock detected. This allows the MN parameter to increase and increase the gas substitution rate, thus optimizing the gas substitution level if no knock occurs. The substitution rate will increase to a value equal to the maximum value allowed for the current engine load and intake manifold temperature.

It shall be appreciated that in the disclosed knock controls, the dual fuel engine gas substitution rate can be controlled to the highest substitution rate possible for the engine operating conditions without any manual intervention. This automatic knock control strategy accounts for changes in ambient temperature, engine conditions, cooling system efficiency or gas quality without the operator needing to manually change the dual fuel control settings.

Figure 16:
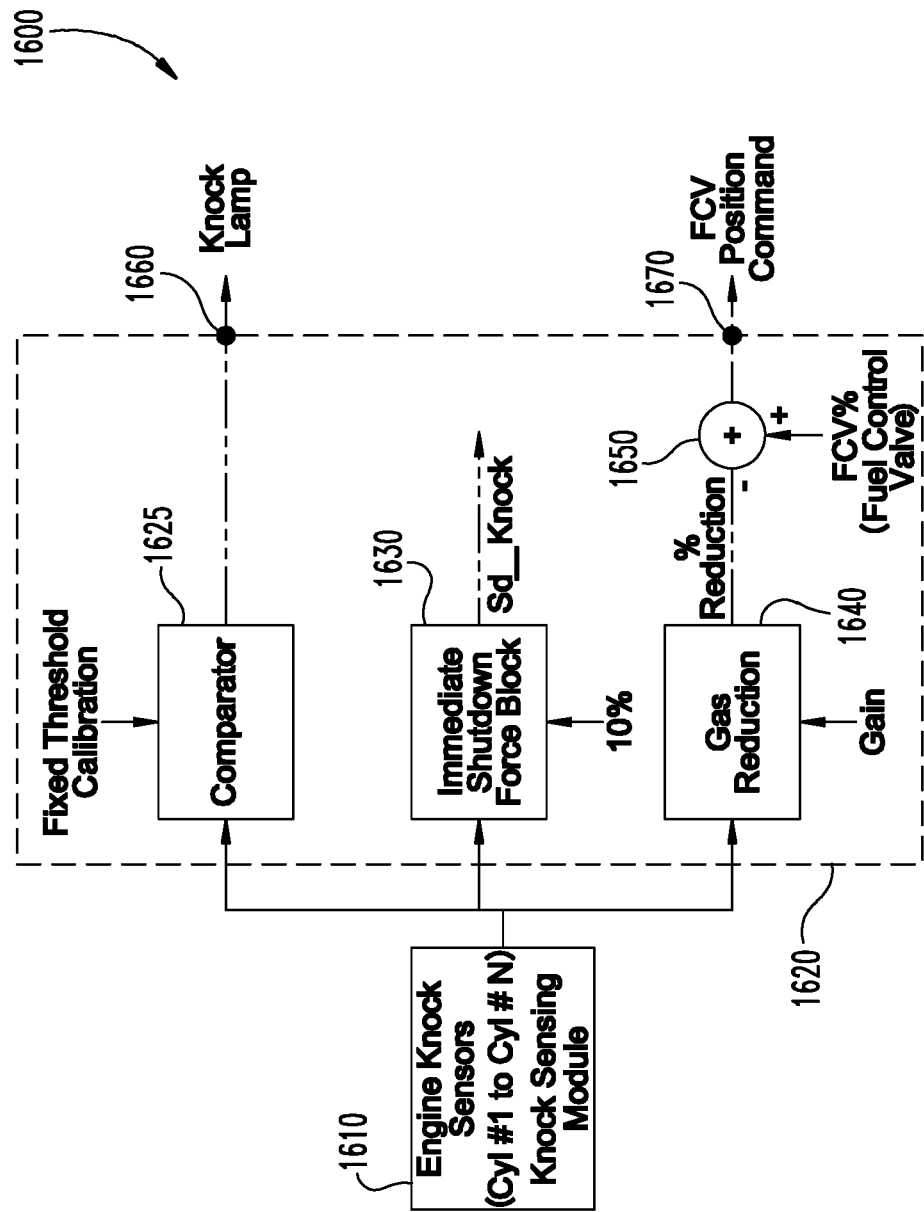

With reference to FIG. 16 there is illustrated a block diagram of exemplary knock controls 1600 which are structured to protect a dual-fuel internal combustion engine system from certain knock events. Controls 1600 are structured to protect against heavy knock but penalize the gas substitution rate when such knock occurs. Controls 1600 include a knock sensing module 1610 which is structured to interpret information from a plurality of knock sensors. The knock sensors may be physical sensors, virtual sensors or combinations thereof. The knock sensors may correspond to the number of cylinders of a given engine. Knock sensing module 1610 provides knock level information to comparator 1625, immediate shutdown force block 1630, and gas reduction block 1640 of gas control module 1620. When the knock level information is above first threshold level, comparator 1625 illuminates a knock indicator such as a knock lamp. When the knock level information is above a second threshold level, which may be the same as or different from the first threshold level, immediate shutdown force block 1630 forces a gas fuel control valve position closed to a predetermined position to reduce gas flow and illuminates knock lamp 1660. Concurrently, the gas substitution rate reference level is reduced by gas reduction block 1640 which provides a reduction value to block 1650 which subtracts the reduction value from the fuel control valve input and provides an adjusted fuel control valve command 1670.

Figure 17:
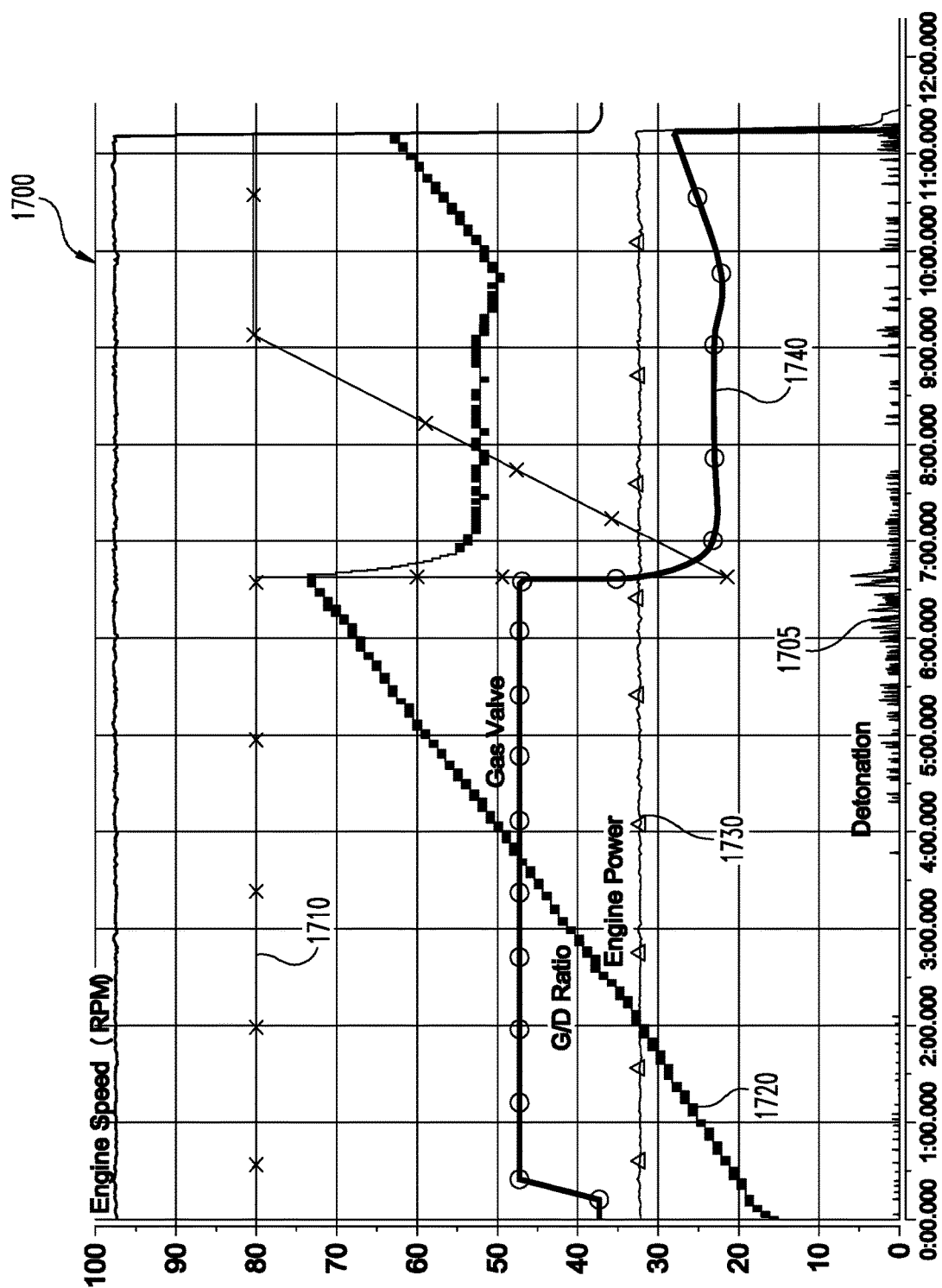
FIG. 17 is a graph illustrating a sequence of knock control events during a startup with 50 methane number (MN) gaseous fuel.

Controls 1600 protect the engine from knock damage. More specifically, when the feed-forward gas pullback occurs the current control algorithm waits a predetermined time before gradually attempting an increase in substitution rate. Graph 1700 in FIG. 17 illustrates a sequence of knock control events during a startup with 50 methane number (MN) gaseous fuel at an engine power level 1730 (indicated by the line marked with triangles.) The block-shaped trace 1720 shows the substitution rate increasing at a constant rate upon startup. As the substitution rate increases, so does the detonation level 1705 as shown at the bottom of the graph 1700. When the detonation level 1705 exceeds a threshold, the knock feed-forward signal 1710 (indicated by the line with "x" marked therealong) is asserted and the gas valve position 1740 (indicated by the line with dots marked therealong) is immediately reduced to lower the gas flow. This reduction of substitution rate continues for a programmable time period. After this delay, the current knock control algorithm starts to increase the gas substitution rate (in FIG. 7 this occurs at ~10 min). As shown, this gas rate increases to improve substitution rate but results in another knock event at ~11 min. At this point the controls shut off gas flow due to knock to prevent a continuous oscillation between the lower pullback substitution rate and the substitution rate that caused the knock pull back.

As is evident from the figures and text presented above, a variety of aspects according to the present disclosure are contemplated. According to one aspect, a method includes determining an expected knock value for a gaseous fuel in a dual fuel engine; determining a current knock value for the gaseous fuel in a dual fuel engine; determining an adjusted substitution rate for the gaseous fuel in response to comparing the expected knock value and the current knock value; and fueling the dual fuel engine with an amount of the gaseous fuel in response to the adjusted substitution rate.

In one embodiment of the method, determining the current knock value includes fueling the dual fuel engine with an amount of the gaseous fuel that is greater than a requested amount of the gaseous fuel. In a refinement of this embodiment, the requested amount of the gaseous fuel includes at least one of an amount of the gaseous fuel indicated by a nominal substitution rate and an amount of the gaseous fuel indicated by a substitution rate in use before the adjusted substitution rate.

In another embodiment, determining the current knock value includes observing a knock event, and determining that a current substitution rate is not expected to incur the knock event. In a refinement of this embodiment, determining the current knock value further includes reducing a substitution rate until the knock event is no longer observed, and determining the reduced substitution rate which does not cause the knock event.

In another embodiment, the method includes considering the operating region of the engine, and associating data regarding expected knock value, current knock value, nominal substitution rate, current substitution rate, and adjusted substitution rate with the operating region of the engine at the time the data is utilized. In a refinement of this embodiment, the operating region of the engine includes at least one parameter selected from the parameters consisting of: engine speed, engine load, charge flow rate, air flow rate, IMT, EMT, IMP, EMP, EGR temperature, oxygen amount, and oxygen fraction.

In another embodiment of the method, determining the adjusted substitution rate for the gaseous fuel includes determining an effective fuel substitution rate for the gaseous fuel, the effective fuel substitution rate for the gaseous fuel including a first amount of gaseous fuel that provides an amount of effective torque equivalent to a second amount of a liquid fuel. In a refinement of this embodiment, the effective fuel substitution rate is distinct from a nominal fuel substitution rate.

According to another aspect, a system includes a duel fuel engine and a controller. The controller includes a knock definition module structured to determine an expected knock value for a gaseous fuel in the dual fuel engine, a knock determination module structured to determine a current knock value for the gaseous fuel in the dual fuel engine, a knock adjustment module structured to determine an adjusted substitution rate for the gaseous fuel in response to comparing the expected knock value and the current knock value, and an engine control module structured to command fueling for the dual fuel engine in response to the adjusted substitution rate.

In one embodiment of the system, the dual fuel engine includes a first gaseous fuel source providing the gaseous fuel and a second liquid fuel source providing a liquid fuel. In a refinement of this embodiment, the system includes a means for determining the expected knock value and/or a means for determining the current knock value. In still another embodiment of refinement of the previous embodiment, the system includes a means for associating the current knock value and the expected knock value outside of the time domain. In a refinement of this embodiment, the means for associating the current knock value and the expected knock value outside of the time domain further includes a means for associating the current knock value and the expected knock value by at least one parameter selected from the parameters consisting of: engine speed, engine load, charge flow rate, air flow rate, IMT, EMT, IMP, EMP, EGR temperature, oxygen amount, and oxygen fraction.

According to another aspect, a method includes operating a dual fuel engine on 100% liquid fuel, and determining an engine load value; determining an expected fuel flow rate in response to a nominal substitution rate, a load substitution description, and the engine load value, where the expected fuel flow rate includes one of a gaseous fuel rate and a resulting liquid fuel rate, and where the load substitution description includes a replacement amount of gaseous fuel that provides an amount of torque equivalent to a replaced amount of a liquid fuel; operating the dual fuel engine at a partially substituted operating condition where a third amount of the liquid fuel is substituted with a fourth amount of the gaseous fuel; comparing one of: the resulting liquid fuel rate to the expected fuel flow rate and an effective gaseous fuel flow rate to the replacement amount of the gaseous fuel, and adjusting the nominal substitution rate in response to the comparing.

According to one embodiment of the method, adjusting includes adjusting one of the nominal substitution rate and the load substitution description in response to the effective gaseous flow rate and the replacement amount of the gaseous fuel. In another embodiment, adjusting includes adjusting one of the nominal substitution rate and the load substitution description in response to the expected fuel flow rate and the third amount of the liquid fuel.

According to another aspect, a system includes an engine output definition module structured to operate a dual fuel engine at one of an increased liquid fuel fraction and a 100% liquid fuel fraction, and to determine an engine load value; a fuel energy definition module structured to determine an expected fuel flow rate in response to a nominal substitution rate, a load substitution description, and the engine load value, where the expected fuel flow rate includes one of a gaseous fuel rate and a resulting liquid fuel rate, and where the load substitution description includes a replacement amount of gaseous fuel that provides an amount of torque equivalent to a replaced amount of a liquid fuel; a fuel check module structured to operate the dual fuel engine at a partially substituted operating condition where a third amount of the liquid fuel is substituted with a fourth amount of the gaseous fuel; a fuel energy quality module structured to compare one of: the resulting liquid fuel rate to the expected fuel flow rate and an effective gaseous fuel flow rate to the replacement amount of the gaseous fuel; and a fuel energy correction module structured to adjust the nominal substitution rate in response to the comparing.

In one embodiment of the system, the dual fuel engine includes a first gaseous fuel source providing the gaseous fuel and a second liquid fuel source providing the liquid fuel. In another embodiment of the system, the engine output definition module is further structured to operate the dual fuel engine at an increased liquid fuel fraction by reducing a gaseous fuel flow rate from a nominal gaseous fuel flow rate determined according to the nominal substitution rate. In a refinement of this embodiment, the engine output definition module is further structured to reduce the gaseous fuel flow rate from the nominal gaseous fuel flow rate by one of a predetermined amount and a detectable amount.

In another embodiment, the gaseous fuel includes at least one fuel selected from the fuels consisting of: well gas, field gas, nominally treated well gas, nominally treated field gas, condensate, LPG, LNG, CBM, commercially available gas, and mixtures of these.

According to another aspect, a method includes operating a dual fuel engine on a first gaseous fuel amount that is less than the gaseous fuel amount indicated by a nominal substitution rate by a predetermined amount, and determining an engine load value; determining an expected fuel flow rate in response to a nominal substitution rate, a load substitution description and the predetermined amount, where the expected fuel flow rate includes one of a second gaseous fuel rate and a resulting liquid fuel rate, and where the load substitution description includes a replacement amount of gaseous fuel that provides an amount of torque equivalent to a replaced amount of a liquid fuel; operating the dual fuel engine at a partially substituted operating condition where a third amount of the liquid fuel is substituted with a fourth amount of the gaseous fuel, and where the partially substituted operating condition includes a greater amount of the gaseous fuel than the first gaseous fuel amount; comparing one of: the resulting liquid fuel rate to the expected fuel flow rate and an effective gaseous fuel flow rate to the replacement amount of the gaseous fuel, and adjusting the nominal substitution rate in response to the comparing.

According to another aspect, a method includes inducing a change in a dual fuel engine to operate at a prescriptively reduced or eliminated gas fuel fraction; determining a torque make up amount of liquid fuel utilized to maintain at least one of: engine speed, engine load, and engine power; determining an effective gas flow rate in response to the torque make up amount of liquid fuel and the prescriptively reduced or eliminated gas fuel fraction; and adjusting at least one of a nominal substitution rate and a load substitution description in response to the effective gas flow rate.

According to another aspect, a method includes determining a first work amount for an operating internal combustion engine; determining a first heat dissipation amount for the operating internal combustion engine; determining a fuel energy amount for the operating internal combustion engine in response to a liquid fuel amount and a gaseous fuel amount; determining a gaseous fuel quality value in response to the fuel energy amount, the first heat dissipation amount, the first work amount, the liquid fuel amount, and the gaseous fuel amount; and adjusting at least one of a nominal substitution rate and a load substitution description in response to the gaseous fuel quality value.

In one embodiment, the method includes determining the fuel energy amount in response to determining the internal combustion engine is operating in a nominal heat transfer environment. In a refinement of this embodiment, determining the internal combustion engine is operating in a nominal heat transfer environment includes at least one operation selected from the operations consisting of: determining that an engine coolant temperature is within a predetermined range (inclusive), determining that an ambient air temperature is within a predetermined range (inclusive), and determining that a vehicle speed is within a predetermined range (inclusive).

In another embodiment of the method, determining the heat dissipation amount includes determining an excess thermal energy amount present in an exhaust gas of the engine. In yet another embodiment of the method, determining the fuel energy amount includes performing a system energy balance, and defining a downstream boundary of the system at one of upstream of a turbine and downstream of a turbine.

In yet another embodiment of the method, adjusting at least one of a nominal substitution rate and a load substitution description includes: adjusting the at least one of the nominal substitution rate and the load substitution description to compensate for an engine knock effect, adjusting the at least one of the nominal substitution rate and the load substitution description to compensate for a fuel injector tip temperature effect, and adjusting the at least one of the nominal substitution rate and the load substitution description to compensate for an exhaust gas temperature effect.

In yet another aspect, a system includes a controller with an energy dissipation module structured to determine a first work amount for an operating internal combustion engine and a first heat dissipation amount for the operating internal combustion engine, an energy generation module structured to determine a fuel energy amount for the operating internal combustion engine in response to a liquid fuel amount and a gaseous fuel amount, a fuel quality determination module structured to determine a gaseous fuel quality value in response to the fuel energy amount, the first heat dissipation amount, the first work amount, the liquid fuel amount, and the gaseous fuel amount, and a fuel energy correction module structured to adjust at least one of a nominal substitution rate and a load substitution description in response to the gaseous fuel quality value.

In one embodiment, the system includes the internal combustion engine having a first gaseous fuel source providing the gaseous fuel amount and a second liquid fuel source providing the liquid fuel amount, and a means for determining the internal combustion engine is operating in a nominal heat transfer environment. In a refinement of this embodiment, the system includes a turbocharger having a turbine side disposed in an exhaust gas stream of the internal combustion engine, and the energy dissipation module is further structured to define a downstream boundary for a system energy balance at an upstream side of the turbine. In another refinement of this embodiment, the system includes a turbocharger having a turbine side disposed in an exhaust gas stream of the internal combustion engine, and the energy dissipation module is further structured to define a downstream boundary for a system energy balance at a downstream side of the turbine.

According to another aspect, a method includes determining a gas composition parameter for a gaseous fuel provided to a dual fuel internal combustion engine, the gas composition parameter including at least one parameter selected from the parameters consisting of: a fuel energy content description and a knock tendency description, adjusting a base fueling recipe in response to the gas composition parameter, and providing a first amount of the gaseous fuel and a second amount of a liquid fuel to the internal combustion engine in response to the adjusting the base fueling recipe.

In one refinement of this method, the gas composition parameter includes a fuel energy content description that indicates a fuel energy content of the gaseous fuel is lower than a nominal fuel energy value, and the adjusting the base fueling recipe includes at least one operation selected from the operations consisting of: increasing an amount of the gaseous fuel provided to the engine, adjusting a load substitution description where the load substitution description includes a replacement amount of the gaseous fuel that provides an amount of torque equivalent to the replaced amount of the liquid fuel, adjusting a nominal substitution rate of the gaseous fuel for the liquid fuel, and adjusting at least one of a target EGR rate and a target charge flow value.

According to another embodiment, the gas composition parameter includes a fuel energy content description that indicates a fuel energy content of the gaseous fuel is higher than a nominal fuel energy value, and adjusting the base fueling recipe includes at least one operation selected from the operations consisting of: decreasing an amount of the gaseous fuel provided to the engine, adjusting a load substitution description where the load substitution description includes a replacement amount of the gaseous fuel that provides an amount of torque equivalent to the replaced amount of the liquid fuel, adjusting a nominal substitution rate of the gaseous fuel for the liquid fuel, and adjusting at least one of a target EGR rate and a target charge flow value.

In another embodiment, the gas composition parameter includes a knock tendency description that indicates a methane number higher than a nominal methane number, and adjusting the base fueling recipe includes at least one operation selected from the operations consisting of: adjusting a liquid fuel injection timing; adjusting a liquid fuel injection pressure, adjusting at least one of a target EGR rate and a target charge flow value, and adjusting a nominal substitution rate of the gaseous fuel for the liquid fuel.

In yet another embodiment, the gas composition parameter includes a knock tendency description that indicates a methane number lower than a nominal methane number, and adjusting the base fueling recipe includes at least one operation selected from the operations consisting of: adjusting a liquid fuel injection timing, adjusting a liquid fuel injection pressure, adjusting at least one of a target EGR rate and a target charge flow value, and adjusting a nominal substitution rate of the gaseous fuel for the liquid fuel.

In another embodiment, the method includes, in response to determining the knock tendency description indicates at least one of an increased knock tendency and a reduced methane number, performing at least one operation selected from the operations consisting of: retarding a liquid fuel injection timing, reducing a liquid fuel injection pressure, increasing a gaseous phase air-fuel-ratio by increasing a fresh air flow rate, and increasing a gaseous phase air-fuel-ratio by decreasing the first amount of the gaseous fuel.

According to another aspect, a system includes a controller that includes a gas composition definition module structured to determine a gas composition parameter for a gaseous fuel provided to an internal combustion engine, the gas composition parameter including at least one parameter selected from the parameters consisting of: a fuel energy content description and a knock tendency description. The controller further includes a combustion management module structured to provide an adjusted base fueling recipe in response to the gas composition parameter, the adjusted base fueling recipe including at least one parameter selected from the parameters consisting of: a gaseous fuel substitution rate, an air-fuel-ratio, a liquid fuel injection timing, a liquid fuel injection pressure, a valve timing selection, an oxygen fraction value, an oxygen amount value, an EGR flow rate value, an EGR fraction value, an IMT value, an IMP value, a charge flow value, and a charge temperature value. The controller also includes an engine control module structured to provide a first amount of the gaseous fuel and a second amount of a liquid fuel to the internal combustion engine in response to the adjusted base fueling recipe.

In one embodiment of the system, the internal combustion engine includes a first gaseous fuel source providing the first amount of the gaseous fuel and a second liquid fuel source providing the second amount of the liquid fuel, and a means for providing an adjusted engine operation in response to the adjusted base fueling recipe.

According to another aspect, a system includes an internal combustion engine including a fuel system having a gaseous fuel source and a liquid fuel source, and the engine further includes a plurality of combustion chambers. A performance isolation device is structured to interpret a first combustion performance indicator of a first one of the combustion chambers, where the first combustion performance indicator is at least partially isolated from the combustion performance of the entire plurality of combustion chambers. The system also includes a controller including a performance check module structured to command the fuel system to provide only liquid fuel to the first one of the combustion chambers, and to provide both gaseous fuel and liquid fuel to the remaining combustion chambers. The controller also includes a performance differentiation module structured to interpret the first combustion performance indicator and to interpret an aggregate performance indicator, a gaseous fuel definition module structured to determine a gas composition parameter in response to the first combustion performance indicator and the aggregate performance indicator, and a composition response module structured to, in response to the gas composition parameter, perform at least one operation selected from the operations consisting of: adjust a base fueling recipe, adjust a nominal substitution rate, adjust a load substitution description where the load substitution description includes a replacement amount of the gaseous fuel that provides an amount of torque equivalent to the replaced amount of the liquid fuel, and store the gas composition parameter in a non-transient memory storage location.

In one embodiment, the performance isolation device includes at least one device selected from the devices consisting of: a temperature sensor positioned to determine an exhaust gas temperature of the first one of the combustion chambers, a temperature sensor positioned to determine an exhaust gas temperature of the plurality of combustion chambers, including preferentially weighting the temperature of the first one of the combustion chambers, a temperature sensor positioned to determine an in-cylinder temperature of the one of the combustion chambers, an accelerometer structured to determine a torque contribution of the first one of the combustion chambers, and a pressure sensor positioned to determine an in-cylinder pressure of the one of the combustion chambers.

In another embodiment, the composition response module is further structured to adjust the base fueling recipe by at least one operation selected from the operations consisting of: adjusting at least one of a target EGR rate and a target charge flow value, adjusting a liquid fuel injection timing, and adjusting a liquid fuel injection pressure.

In yet another embodiment, the aggregate performance indicator includes at least one of the following: a bulk exhaust gas temperature, an average combustion event torque contribution, a modeled combustion event parameter, and a predetermined combustion event parameter stored in a non-transient memory location.

According to another aspect, an apparatus includes a performance check module structured to command a fuel system to provide only liquid fuel to a first one of a plurality of combustion chambers, and to provide both gaseous fuel and liquid fuel to the remaining combustion chambers; a performance differentiation module structured to interpret a first combustion performance indicator and to interpret an aggregate performance indicator; a gaseous fuel definition module structured to determine a gas composition parameter in response to the first combustion performance indicator and the aggregate performance indicator; and a composition response module structured to, in response to the gas composition parameter, perform at least one operation selected from the operations consisting of: adjust a base fueling recipe, adjust a nominal substitution rate, adjust a load substitution description where the load substitution description includes a replacement amount of the gaseous fuel that provides an amount of torque equivalent to the replaced amount of the liquid fuel, and store the gas composition parameter in a non-transient memory storage location.

In one embodiment, the composition response module is further structured to, in response to determining the gas composition parameter indicates at least one of an increased knock tendency and a reduced methane number, perform at least one operation selected from the operations consisting of: retard a liquid fuel injection timing, reduce a liquid fuel injection pressure, increase a gaseous phase air-fuel-ratio by increasing a fresh air flow rate, and increase a gaseous phase air-fuel-ratio by decreasing an amount of the gaseous fuel.

According to another aspect, a system includes an internal combustion engine having a first cylinder and a second cylinder. The system also includes a fuel system having a first fuel source including a diesel fuel and a second fuel system having a second fuel source including a gaseous fuel, each of the first cylinder and the second cylinder operationally coupled to both the first fuel system and the second fuel system. The system also includes a controller that includes an engine condition module structured to interpret an engine operating value and a fuel control module. The fuel control module is structured to provide, in response to the engine operating value, at least one first fuel source command and at least one second fuel source command such that a first ratio of the diesel fuel to the gaseous fuel in the first cylinder (d1:g1) is distinct from a second ratio of the diesel fuel to the gaseous fuel in the second cylinder (d2:g2).

In one embodiment, the engine operating value includes a fuel injector tip temperature value. In a refinement of this embodiment, the fuel control module is further structured to increase the ratio d1:g1 to reduce the fuel injector tip temperature value for the injector tip in the first cylinder. In a further refinement, the fuel control module is further structured to alternate increased diesel ratios between cylinders to reduce the fuel injector tip temperature values corresponding to the injector tips in each of the various cylinders.

In another embodiment, the second fuel system includes one of gaseous port injection and gaseous direct injection, and the engine operating value includes a gaseous injector failure value corresponding to the first cylinder, and the fuel control module is further structured to modify the ratio d1:g1 in response to the gaseous injector failure value. In a refinement of this embodiment, the fuel control module is further structured to increase a diesel fueling amount to the first cylinder in response to the gaseous injector failure value indicating a gaseous fuel injector operationally coupled to the first cylinder is delivering less than a scheduled fueling amount of gaseous fuel. In another refinement, the fuel control module is further structured to decrease a diesel fueling amount to the first cylinder in response to the gaseous injector failure value indicating a gaseous fuel injector operationally coupled to the first cylinder is delivering greater than a scheduled fueling amount of gaseous fuel. In yet another refinement, the fuel control module is further structured to increase a gaseous fueling amount in at least one cylinder of the internal combustion engine that is not the first cylinder.

In another embodiment, the fuel control module is further structured to provide the first fuel source command such that the first cylinder is fully fueled with diesel. In a refinement of this embodiment, the engine operating value includes an emissions value. In a further refinement, the emissions value includes at least one value selected from the values consisting of: an aftertreatment component regeneration request, an unburned hydrocarbons value, and an exhaust temperature value.

In another refinement of the previous embodiment, the system includes a transient detection module structured to provide the engine operating value as a transient duty cycle value. In a further refinement, the transient detection module is further structured to provide the engine operating value by at least one operation selected from the operations consisting of: utilizing a high pass filtered load value of the engine, utilizing a derivative load value of the engine, utilizing a slope value of moving average engine load values, accepting an operator input indicating an upcoming transient, and interpreting a load schedule (e.g. a pump schedule) indicating an upcoming transient. In a further embodiment, the transient detection module is structured to interpret a geological formation schedule and operate the engine in response to transient conditions created by the geological formation. In a further embodiment, differential fuelling or substitution rates of gaseous fuel for liquid fuel between cylinders and/or between cylinder banks of a duel fuel engine is performed in response to transient conditions.

In another aspect, a system includes a dual-fuel engine structured to selectably combust liquid fuel injected into a cylinder of the engine and gaseous fuel provided to the cylinder with the intake charge. The system also includes an electronically controllable valve structured to control a flow of the gaseous fuel and an electronic controller. The controller is structured to determine a parameter representative of a gaseous fuel quality based upon at least one of a first value externally input into the system and a second value determined by the electronic controller without external input to the system, determine a substitution parameter for substitution of gaseous fuel for liquid fuel based upon an engine load value, an intake manifold temperature value, and the parameter representative of the gaseous fuel quality, and control the electronically controllable valve to control the flow of the gaseous fuel based upon the substitution parameter.

In one embodiment, the substitution parameter is a substitution rate. In another embodiment, the controller utilizes the engine load value, the intake manifold temperature value, and the gaseous fuel quality value to determine a target substitution rate from a set of tables. In a further embodiment, the parameter representative of the gaseous fuel quality comprises a methane number (MN).

In yet another embodiment, the controller is structured to selectably determine the parameter representative of the gaseous fuel quality based upon either the first value or the second value. In a refinement of this embodiment, the controller is structured to determine the second value based upon engine knock information. In a further refinement, the engine knock information includes a number of knock events and a knock event magnitude. In yet a further refinement, the controller is structured to reduce the substitution parameter based upon either the number of knock events exceeding a first limit or the knock event magnitude exceeding a second limit. In another refinement, the controller is structured to increase the gaseous fuel quality value up to a maximum value until the engine knock information meets a predetermined criterion. In a further refinement, the controller is structured to decrease the substitution parameter if the engine knock information meets the predetermined criterion and to later resume increasing the value of the gaseous fuel quality.

According to another aspect, a method includes operating a dual-fuel engine structured to selectably combust a combination of liquid fuel injected into a cylinder of the engine and gaseous fuel provided to the cylinder. The system includes an actuator structured to control flow of the gaseous fuel and a controller structured to control the actuator. The method further includes operating the controller to determine a gaseous fuel quality based upon at least one of a first value input into the system by an operator and a second value determined by the electronic controller, determine a target substitution value for substitution of gaseous fuel for liquid fuel based upon an engine load, an intake manifold temperature, and the gaseous fuel quality, and control the actuator to control the flow of the gaseous fuel based upon the target substitution value.

In one embodiment, the substitution value is a substitution quantity. In another embodiment, the controller utilizes the engine load, the intake manifold temperature, and the determined gaseous fuel quality as inputs to a set of look-up tables to determine the target substitution value. In a refinement of this embodiment, the controller interpolates between discrete table values to determine the target substitution value. In yet another embodiment, the determined gaseous fuel quality comprises a methane number (MN).

In yet another embodiment, the controller is structured to determine the gaseous fuel quality based upon either the first value or the second value, and the controller is structured to determine the second value based on engine knock information. In a refinement of this embodiment, the engine knock information includes a knock event counter value. In a further refinement, the controller is structured to reduce the substitution value based upon the knock event counter value exceeding first limit.

In another embodiment, the controller is structured to increase the determined gaseous fuel quality up to a predetermined value until the engine knock information meets a predetermined criterion. In a refinement of this embodiment, the controller is structured to stop increasing or decrease the determined gaseous fuel quality when the engine knock information meets the predetermined criterion and to later resume increasing the determined gaseous fuel quality.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention.

Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining an expected knock value for a gaseous fuel in a dual fuel engine;
   determining a current knock value for the gaseous fuel in a dual fuel engine;
   determining an adjusted substitution rate for the gaseous fuel in response to comparing the expected knock value and the current knock value; and
   fueling the dual fuel engine with an amount of the gaseous fuel in response to the adjusted substitution rate, wherein the determining the current knock value comprises fueling the dual fuel engine with an amount of the gaseous fuel that is greater than a requested amount of the gaseous fuel, wherein the requested amount of the gaseous fuel comprises at least one of an amount of the gaseous fuel indicated by a nominal substitution rate and an amount of the gaseous fuel indicated by a substitution rate in use before the adjusted substitution rate.

2. The method of claim 1, wherein the determining the current knock value comprises observing a knock event, and determining that a current substitution rate is not expected to incur the knock event, wherein the determining the current knock value further comprises reducing a substitution rate until the knock event is no longer observed, and determining the reduced substitution rate which does not cause the knock event.

3. The method of claim 1, further comprising considering an operating region of the engine, and associating data regarding the expected knock value, the current knock value, a nominal substitution rate, a current substitution rate, and the adjusted substitution rate with the operating region of the engine at the time the data is utilized.

4. The method of claim 3, wherein the operating region of the engine comprises at least one parameter selected from the parameters consisting of: an engine speed, an engine load, a charge flow rate, an air flow rate, an intake manifold temperature, an exhaust manifold temperature, an intake manifold pressure, an exhaust manifold temperature, a recirculated exhaust gas temperature, an oxygen amount, and an oxygen fraction.

5. The method of claim 1, wherein the determining the adjusted substitution rate for the gaseous fuel comprises determining an effective fuel substitution rate for the gaseous fuel, the effective fuel substitution rate for the gaseous fuel comprising a first amount of gaseous fuel that provides an amount of effective torque equivalent to a second amount of a liquid fuel, wherein the effective fuel substitution rate is distinct from a nominal fuel substitution rate.

6. A system, comprising:
a dual fuel engine operable with a liquid fuel and a gaseous fuel; and
a controller operably coupled to the engine, wherein the controller is configured to determine an expected knock value for the gaseous fuel in the dual fuel engine and a current knock value for the gaseous fuel in the dual fuel engine, the controller further being configured to determine an adjusted substitution rate for the gaseous fuel in response to comparing the expected knock value and the current knock value, and to command fueling for the dual fuel engine in response to the adjusted substitution rate, and wherein the controller is configured to determine the current knock value in response to the dual fuel engine being fueled with an amount of the gaseous fuel that is greater than a requested amount of the gaseous fuel.

7. The system of claim 6, further comprising the dual fuel engine having a first gaseous fuel source providing the gaseous fuel and a second liquid fuel source providing a liquid fuel.

8. The system of claim 7, further comprising:
a means for determining the expected knock value;
a means for determining the current knock value; and
a means for associating the current knock value and the expected knock value, wherein the current knock value is determined in a time domain and the expected knock value is determined outside the time domain in which the current knock value is determined.

9. The system of claim 8, wherein the means for associating the current knock value and the expected knock value further comprises a means for associating the current knock value and the expected knock value by at least one parameter selected from the parameters consisting of: an engine speed, an engine load, a charge flow rate, an air flow rate, an intake manifold temperature, an exhaust manifold temperature, an intake manifold pressure, an exhaust manifold pressure, a recirculated exhaust gas temperature, an oxygen amount, and an oxygen fraction.

10. The method of claim 1, wherein the current knock value is determined in a time domain and the expected knock value is determined outside the time domain in which the current knock value is determined.

11. The system of claim 6, wherein the requested amount of the gaseous fuel comprises at least one of an amount of the gaseous fuel indicated by a nominal substitution rate and an amount of the gaseous fuel indicated by a substitution rate in use before the adjusted substitution rate.

* * * * *